US012138912B2

(12) United States Patent
Hasegawa et al.

(10) Patent No.: US 12,138,912 B2
(45) Date of Patent: Nov. 12, 2024

(54) PRINTER, PRINTED MATTER, AND PRINTING METHOD

(71) Applicant: Roland DG Corporation, Hamamatsu (JP)

(72) Inventors: Hikaru Hasegawa, Hamamatsu (JP); Masanori Ishihara, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 125 days.

(21) Appl. No.: 17/895,351

(22) Filed: Aug. 25, 2022

(65) Prior Publication Data

US 2023/0066252 A1 Mar. 2, 2023

(30) Foreign Application Priority Data

Sep. 1, 2021 (JP) ................................ 2021-142335

(51) Int. Cl.

*B41J 2/21* (2006.01)
*B41J 2/045* (2006.01)
*B41M 5/50* (2006.01)
*B41J 11/00* (2006.01)

(52) U.S. Cl.

CPC ....... *B41J 2/04505* (2013.01); *B41J 2/04586* (2013.01); *B41J 2/2114* (2013.01); *B41M 5/502* (2013.01); *B41J 11/00214* (2021.01)

(58) Field of Classification Search

CPC ...................................................... B41J 2/2114
See application file for complete search history.

(56) References Cited

U.S. PATENT DOCUMENTS

2010/0053287 A1* 3/2010 Belelie .................. C09D 11/34 347/100
2013/0293657 A1* 11/2013 Delmerico ................ B41J 3/32 347/171
2013/0323432 A1* 12/2013 Rygas ................... G07D 7/181 427/511
2017/0210145 A1* 7/2017 Kubo ....................... B41M 7/00
2021/0206163 A1* 7/2021 Mizuno ................. B41J 2/2114

FOREIGN PATENT DOCUMENTS

JP 2020-029076 A 2/2020

* cited by examiner

*Primary Examiner* — Shelby L Fidler
(74) *Attorney, Agent, or Firm* — Keating & Bennett, LLP

(57) ABSTRACT

A printer includes a controller to exercise control so as to print a print layer on or over a medium. The print layer includes a first print region including first protrusions, and a second print region including second protrusions. Any one or more of a size, a height, a planar shape, an arrangement interval, and an arrangement direction of the first protrusions is/are different from a corresponding one or more of a size, a height, a planar shape, an arrangement interval, and an arrangement direction of the second protrusions. An extracted area of about 3 cm by about 3 cm is extracted from any location in the print layer. The first and second print regions are in the extracted area. At least either a number of first print regions or a number of second print regions in the extracted area is more than one.

21 Claims, 19 Drawing Sheets

FIG.9

| | LENGTH OF EACH SIDE OF FIRST PRINT REGION (21) | LENGTH OF EACH SIDE OF SECOND PRINT REGION (22) | FIRST PROTRUSION (25) | | SECOND PROTRUSION (26) | |
|---|---|---|---|---|---|---|
| | | | MAXIMUM DIMENSION | ARRANGEMENT INTERVAL | MAXIMUM DIMENSION | ARRANGEMENT INTERVAL |
| EXAMPLE 1 | 0.5mm | 0.5mm | 50μm | 150μm | 100μm | 150μm |
| EXAMPLE 2 | 0.5mm | 0.5mm | 50μm | 300μm | 250μm | 300μm |
| EXAMPLE 3 | 0.5mm | 0.5mm | 50μm | 150μm | 50μm | 300μm |
| EXAMPLE 4 | 1.0mm | 1.0mm | 50μm | 150μm | 100μm | 150μm |
| EXAMPLE 5 | 1.0mm | 1.0mm | 50μm | 300μm | 250μm | 300μm |
| EXAMPLE 6 | 1.0mm | 1.0mm | 50μm | 150μm | 50μm | 300μm |
| EXAMPLE 7 | 1.5mm | 1.5mm | 50μm | 150μm | 100μm | 150μm |
| EXAMPLE 8 | 1.5mm | 1.5mm | 50μm | 300μm | 250μm | 300μm |
| EXAMPLE 9 | 1.5mm | 1.5mm | 50μm | 150μm | 50μm | 300μm |
| EXAMPLE 10 | 2.0mm | 2.0mm | 50μm | 150μm | 100μm | 150μm |
| EXAMPLE 11 | 2.0mm | 2.0mm | 50μm | 300μm | 250μm | 300μm |
| EXAMPLE 12 | 2.0mm | 2.0mm | 50μm | 150μm | 50μm | 300μm |

FIG. 15

21A 22A 25 26

| | DIAMETER OF FIRST PRINT REGION | DIAMETER OF SECOND PRINT REGION | FIRST PROTRUSION | | SECOND PROTRUSION | |
|---|---|---|---|---|---|---|
| | | | MAXIMUM DIMENSION | ARRANGEMENT INTERVAL | MAXIMUM DIMENSION | ARRANGEMENT INTERVAL |
| EXAMPLE 13 | 1mm | 0.5mm | 50μm | 150μm | 100μm | 150μm |
| EXAMPLE 14 | 1mm | 0.5mm | 50μm | 300μm | 250μm | 300μm |
| EXAMPLE 15 | 1mm | 0.5mm | 50μm | 150μm | 50μm | 300μm |
| EXAMPLE 16 | 1mm | 0.5mm | 100μm | 150μm | 50μm | 150μm |
| EXAMPLE 17 | 1mm | 0.5mm | 250μm | 300μm | 50μm | 300μm |
| EXAMPLE 18 | 1mm | 0.5mm | 50μm | 300μm | 50μm | 150μm |
| EXAMPLE 19 | 2mm | 1mm | 50μm | 150μm | 100μm | 150μm |
| EXAMPLE 20 | 2mm | 1mm | 50μm | 300μm | 250μm | 300μm |
| EXAMPLE 21 | 2mm | 1mm | 50μm | 150μm | 50μm | 300μm |
| EXAMPLE 22 | 2mm | 1mm | 100μm | 150μm | 50μm | 150μm |
| EXAMPLE 23 | 2mm | 1mm | 250μm | 300μm | 50μm | 300μm |
| EXAMPLE 24 | 2mm | 1mm | 50μm | 300μm | 50μm | 150μm |

PRINTER, PRINTED MATTER, AND PRINTING METHOD

CROSS REFERENCE TO RELATED APPLICATIONS

This application claims the benefit of priority to Japanese Patent Application No. 2021-142335 filed on Sep. 1, 2021. The entire contents of this application are incorporated herein by reference.

BACKGROUND OF THE INVENTION

1. Field of the Invention

The present invention relates to printers, printed matters, and printing methods.

2. Description of the Related Art

JP 2020-29076 A, for example, discloses a printed matter including a base material whose surface has a tactile texture. The printed matter includes a first print region including a plurality of protrusions arranged on a surface of the base material, and a second print region including a plurality of protrusions arranged on the surface of the base material. Arrangement interval(s) between the protrusions in the first print region is/are different from arrangement interval(s) between the protrusions in the second print region. The arrangement interval(s) between the protrusions will be referred to as "protrusion arrangement interval(s)". In one example, the protrusion arrangement interval(s) in the first print region is/are greater than the protrusion arrangement interval(s) in the second print region.

Making the protrusion arrangement interval(s) in the first print region different from the protrusion arrangement interval(s) in the second print region as described above enables a tactile texture of the first print region to differ from a tactile texture of the second print region. Making the protrusion arrangement interval(s) in the first print region greater than the protrusion arrangement interval(s) in the second print region, for example, enables the first print region to be rougher to the touch than the second print region. The first and second print regions are thus allowed to have different tactile textures without any change in the height of the protrusions.

When the printed matter disclosed in JP 2020-29076 A is to be touched with a fingertip, for example, only the first print region, only the second print region, or a region extending across a boundary between the first and second print regions will be touched. This unfortunately places a limit on the variety of tactile textures when the printed matter is touched with a fingertip. A greater variety of tactile textures is thus preferably provided in a simpler manner.

SUMMARY OF THE INVENTION

Accordingly, preferred embodiments of the present invention provide printers to produce printed matters that are able to provide a greater variety of tactile textures when touched with fingertips, such printed matters, and printing methods for producing such printed matters.

A preferred embodiment of the present invention provides a printer including a support table to support a medium, an ink head to discharge ink onto or toward the medium supported by the support table, a conveyor to move the ink head relative to the medium supported by the support table, and a controller configured or programmed to exercise control so as to print a print layer on or over the medium. The print layer includes a first print region including a plurality of first protrusions, and a second print region including a plurality of second protrusions. Any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region. When an extracted area that is about 3 cm by about 3 cm, for example, is extracted from any location in the print layer, the first and second print regions are located in the extracted area, and at least either a plurality of first print regions or a plurality of second print regions are in the extracted area.

The size of the extracted area, which is about 3 cm by about 3 cm, for example, is decided in accordance with the area of contact of a fingertip with the print layer when the print layer is touched with the fingertip. The print layer is printed by the printer such that the first and second print regions have different tactile textures. In this preferred embodiment, touching the print layer printed on or over the medium with a fingertip allows a user to simultaneously touch the first and second print regions having different tactile textures and to simultaneously touch at least either more than one first print region or more than one second print region. Accordingly, the present preferred embodiment involves causing the first and second print regions, which are to be simultaneously touched with a fingertip, to have different tactile textures so as to produce printed matters having various types of tactile textures.

Another preferred embodiment of the present invention provides a printed matter including a medium, and a print layer on or over the medium, the print layer being made of ink. The print layer includes a first print region including a plurality of first protrusions, and a second print region including a plurality of second protrusions. Any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region. When an extracted area that is about 3 cm by about 3 cm is extracted from any location in the print layer, the first and second print regions are in the extracted area, and at least either the number of first print regions or the number of second print regions in the extracted area is more than one.

Still another preferred embodiment of the present invention provides a printing method including preparing a medium, and printing a print layer on or over the medium. The print layer includes a first print region including a plurality of first protrusions, and a second print region including a plurality of second protrusions. Any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region. When an extracted area that is about 3 cm by about 3 cm is extracted from any location in the print layer, the first and second print regions are disposed in the extracted area, and at least either the number of first print regions or the number of second print regions in the extracted area is more than one.

The above and other elements, features, steps, characteristics, and advantages of the present invention will become more apparent from the following detailed description of the preferred embodiments with reference to the attached drawings.

BRIEF DESCRIPTION OF THE DRAWINGS

FIG. 9 is a table listing the sizes of first print regions, second print regions, first protrusions, and second protrusions in Examples 1 to 12.

FIG. 15 is a table listing the sizes of first print regions, second print regions, first protrusions, and second protrusions in Examples 13 to 24.

DETAILED DESCRIPTION OF THE PREFERRED EMBODIMENTS

Preferred embodiments of the present invention will be described below with reference to the drawings. The preferred embodiments described below are naturally not intended to limit the present invention in any way. Components and elements having the same functions are identified by the same reference signs, and description thereof will be simplified or omitted when deemed redundant.

First Preferred Embodiment

Figure 1:
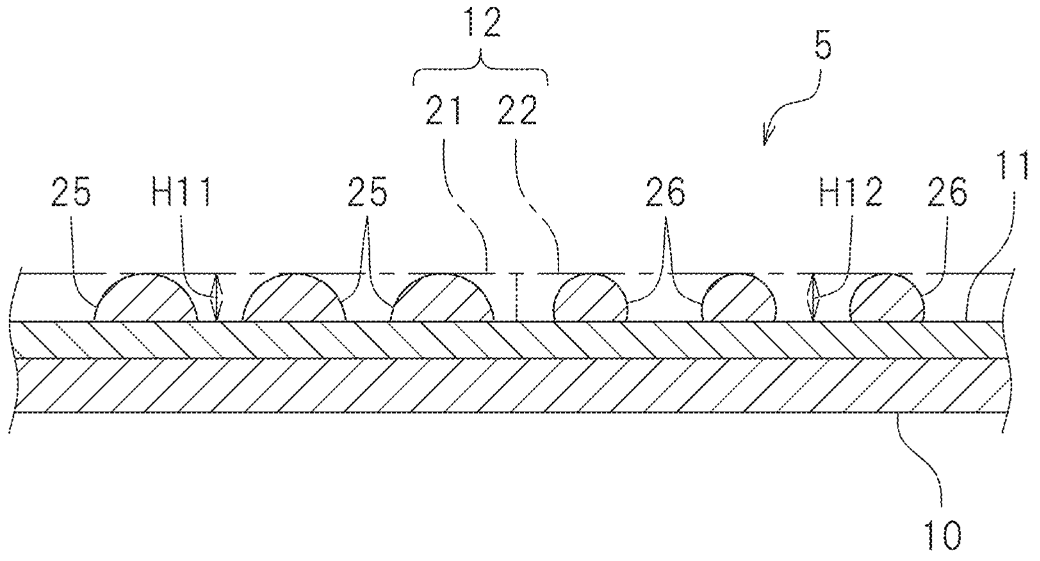
FIG. 1 is a cross-sectional view of a printed matter according to a first preferred embodiment of the present invention.

First, a printed matter 5 according to a first preferred embodiment of the present invention will be described. FIG. 1 is a cross-sectional view of the printed matter 5 according to the first preferred embodiment. The printed matter 5 illustrated in FIG. 1 is produced using, for example, a printer 100 (see FIG. 2), which will be described below. As illustrated in FIG. 1, the printed matter 5 includes a medium 10, a first print layer 11, and a second print layer 12.

The medium 10 is, for example, paper. The medium 10, however, is not limited to any particular type of medium. The medium 10 may be a relatively thick medium, examples of which include a sheet made of a resin material, such as polyvinyl chloride (PVC) or polyester, a metallic plate, a glass plate, and a wood plate. The medium 10 may be, for example, a three-dimensional object, such as a smartphone case.

In the present preferred embodiment, the first print layer 11 and the second print layer 12 are formed by using ink discharged from the printer 100. The first print layer 11 is printed on the medium 10. The first print layer 11 is formed on the medium 10 (i.e., on a surface or an upper surface of the medium 10). In the present preferred embodiment, the first print layer 11 is an underlying layer. The first print layer 11 is formed by using, for example, underlying ink, such as primer ink or white ink.

Alternatively, the first print layer 11 may be an image forming layer that forms an image, such as a picture, a pattern, a figure, and/or a character in accordance with, for example, image data. The first print layer 11 may have a multilayer structure with an underlying layer and an image forming layer. In other words, the first print layer 11 may include an underlying layer and an image forming layer. Stacking layers on top of another, for example, may form the first print layer 11 including an underlying layer and an image forming layer. The underlying layer may be a single layer or may include a plurality of layers. The image forming layer may be a single layer or may include a plurality of layers.

The second print layer 12 is printed over the medium 10. In this preferred embodiment, the second print layer 12 is printed on the first print layer 11 such that the second print layer 12 overlaps with the first print layer 11 printed on the medium 10. The second print layer 12 is formed over the medium 10 (i.e., over the surface or the upper surface of the medium 10). In the present preferred embodiment, the second print layer 12 is formed on a surface or an upper surface of the first print layer 11. The second print layer 12 is thus formed over the surface of the medium 10, with the first print layer 11 interposed between the medium 10 and the second print layer 12.

The second print layer 12 is an example of a print layer according to a preferred embodiment of the present invention. The second print layer 12 is printed by discharging clear ink. In other words, the second print layer 12 is formed by using clear ink. The second print layer 12 may be formed by stacking layers on top of another. The second print layer 12 may be a single layer or may include a plurality of layers. The second print layer 12 will be described in more detail below.

In the present preferred embodiment, the first print layer 11 is printed on the medium 10, and the second print layer 12 is printed on the first print layer 11 such that the second print layer 12 overlaps with the first print layer 11. From the viewpoint of increasing the adhesion between the ink of the second print layer 12 and the medium 10, the first print layer 11, which is an example of an underlying layer, is formed between the second print layer 12 and the medium 10. For example, when the adhesion between the ink of the second print layer 12 and the medium 10 is high, the printed matter 5 may include no first print layer 11. In this case, the second print layer 12 is printed directly on the medium 10.

Figure 2:
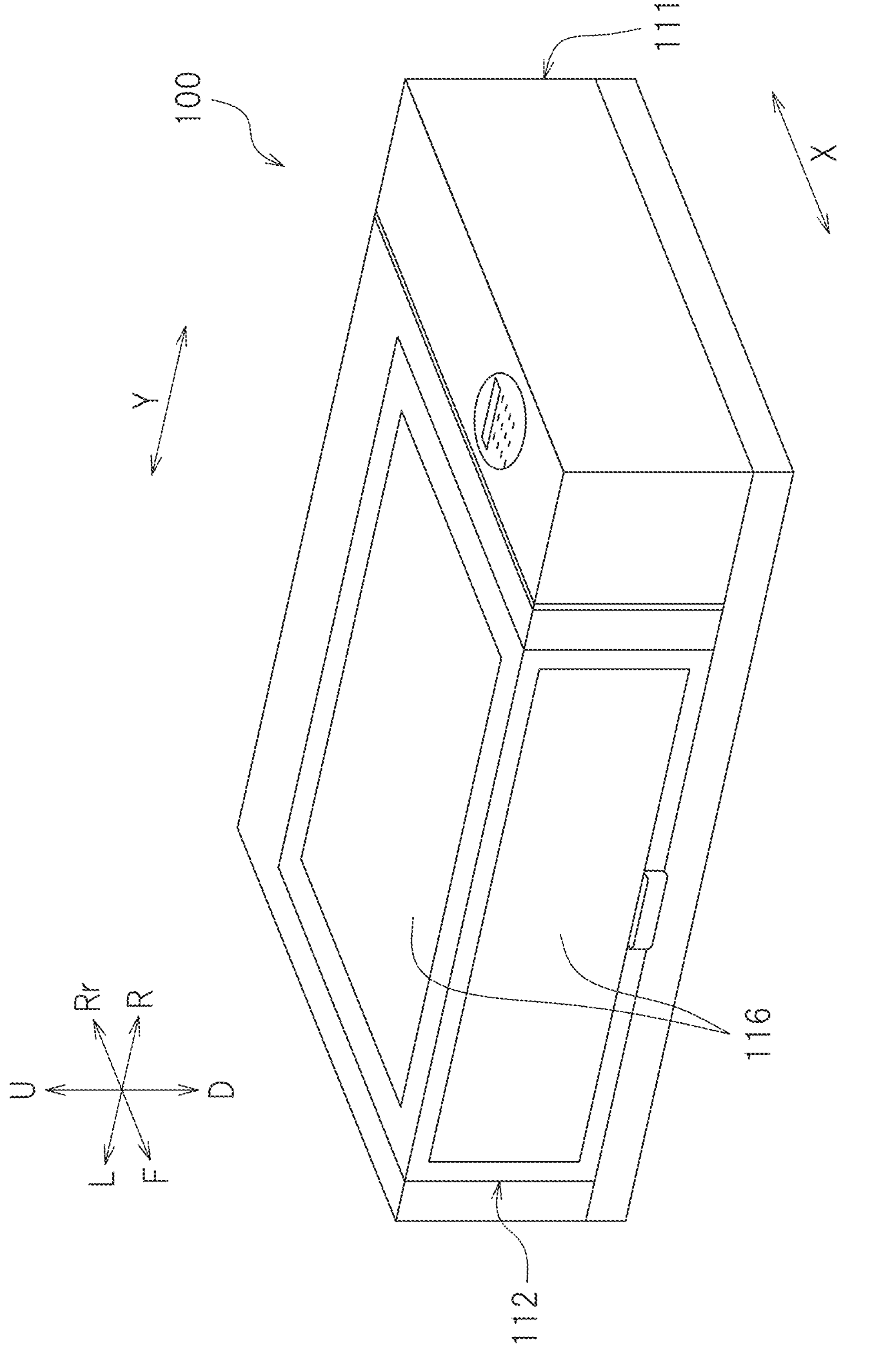
FIG. 2 is a perspective view of a printer.
Figure 3:
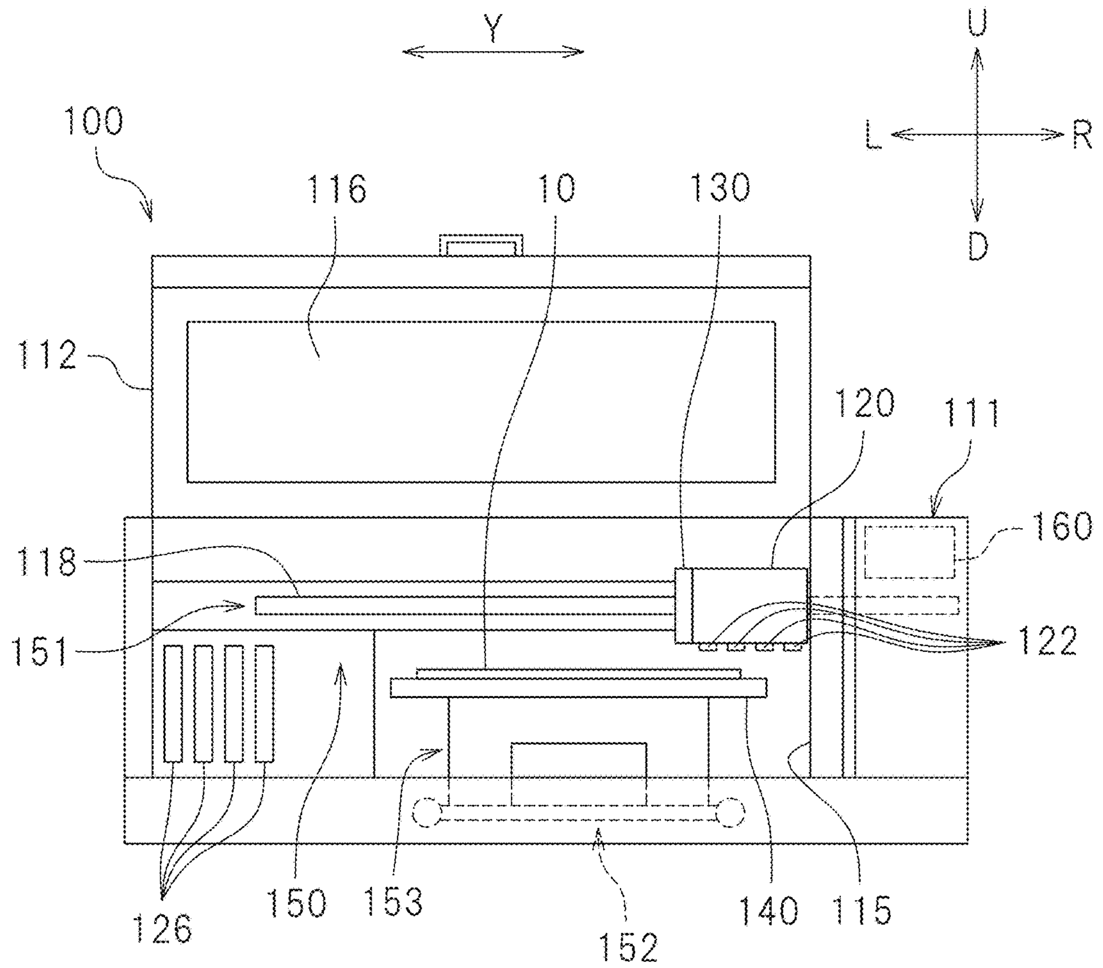
FIG. 3 is a front view of the printer with its cover opened.
Figure 4:
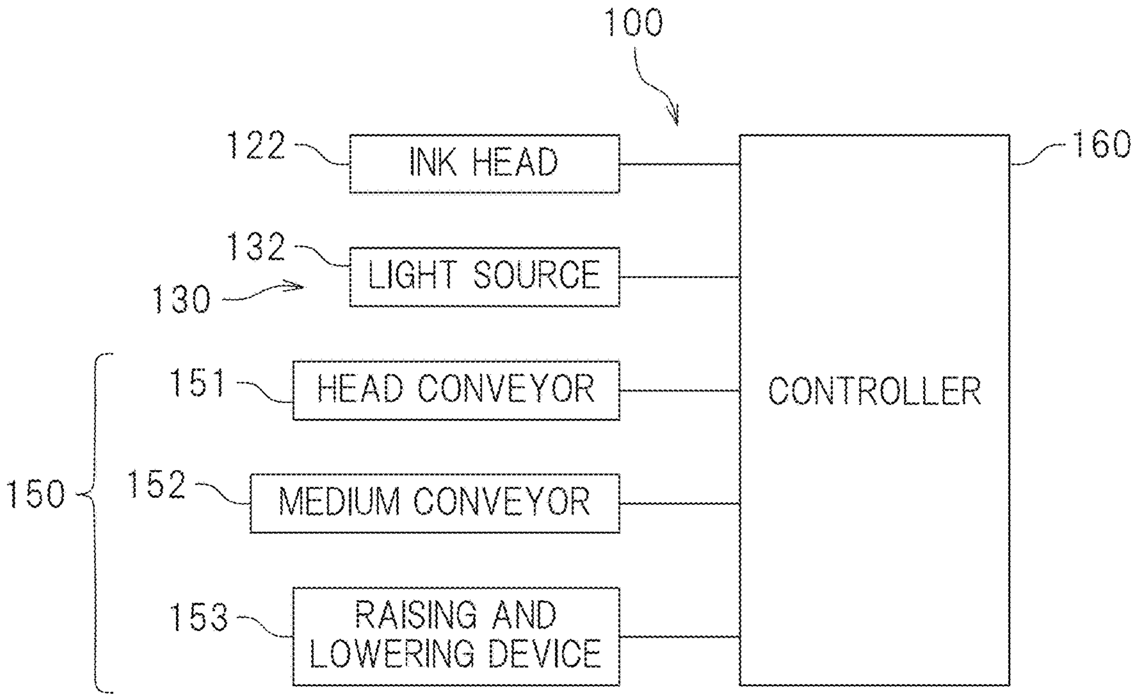
FIG. 4 is a block diagram of the printer.

The following description discusses a structure of the printer 100 to print the first print layer 11 on the medium 10 and print the second print layer 12 on the first print layer 11. FIG. 2 is a perspective view of the printer 100 according to the present preferred embodiment. FIG. 3 is a front view of the printer 100 according to the present preferred embodiment. FIG. 4 is a block diagram of the printer 100 according to the present preferred embodiment. In the following description, the reference signs "F", "Rr", "L", "R", "U", and "D" in the drawings respectively represent front, rear, left, right, up, and down with respect to the center of the printer 100. The reference sign "Y" in the drawings represents a main scanning direction. The reference sign "X" in the drawings represents a sub-scanning direction. The main scanning direction Y corresponds to, for example, a right-left direction. The sub-scanning direction X intersects with the main scanning direction Y in plan view. In this preferred embodiment, the sub-scanning direction X is perpendicular or substantially perpendicular to the main scanning direction Y in plan view. The sub-scanning direction X corresponds to, for example, a front-rear direction. These directions, however, are defined merely for the sake of convenience of description. These directions do not limit in any way how the printer 100 may be installed.

As illustrated in FIG. 3, the printer 100 discharges ink onto or toward the medium 10 so as to effect printing on or over the medium 10. In this preferred embodiment, the printer 100 prints the first print layer 11 on the medium 10 and prints the second print layer 12 on the first print layer 11. The first and second print layers 11 and 12 are thus stacked on the surface of the medium 10. The printer 100 produces the printed matter 5 illustrated in FIG. 1.

The printer 100 performs inkjet printing. In other words, the printer 100 is an inkjet printer. In the present preferred embodiment, the printer 100 is a "flatbed printer". Moving a support table 140 (see FIG. 3), which will be described below, in the sub-scanning direction X moves the medium 10 in the sub-scanning direction X. Alternatively, the printer 100 may be a "roll-to-roll printer". In this case, the medium 10 in a roll form is unrolled in the sub-scanning direction X. Alternatively, the printer 100 may be a "moving gantry flatbed printer". In this case, the support table 140 does not move, and ink heads 122 (see FIG. 3) move in the sub-scanning direction X and the main scanning direction Y.

As illustrated in FIG. 2, the printer 100 includes a case 111 and a cover 112. The case 111 has, for example, a cuboidal shape. The case 111 includes an internal space. In the internal space, the first print layer 11 is printed on the medium 10, and the second print layer 12 is printed on the first print layer 11. As illustrated in FIG. 3, the front portion of the case 111 is provided with an opening 115.

The cover 112 is supported by the case 111 such that the cover 112 covers and uncovers the opening 115. The cover 112 is rotatable around its rear end. As illustrated in FIG. 2, the front and upper portions of the cover 112 are provided with windows 116. The windows 116 are transparent or semitransparent members, such as acrylic plates. A user is able to visually check the internal space of the case 111 through the windows 116.

An internal structure of the printer 100 will now be described. As illustrated in FIG. 3, the printer 100 includes a guide rail 118, a carriage 120, the ink heads 122, a light applicator 130, and the support table 140.

The guide rail 118 is secured to the case 111 in the internal space of the case 111. The guide rail 118 extends in the main scanning direction Y. The carriage 120 is in slidable engagement with the guide rail 118. The carriage 120 is movable in the main scanning direction Y along the guide rail 118.

The ink heads 122 discharge ink onto or toward the medium 10 supported by the support table 140. The ink heads 122 are mounted on the carriage 120. The ink heads 122 are movable in the main scanning direction Y together with the carriage 120. The printer 100 may include any suitable number of ink heads 122. In the present preferred embodiment, the number of ink heads 122 is four, for example. The four ink heads 122 are disposed side by side in the main scanning direction Y.

Figure 5:
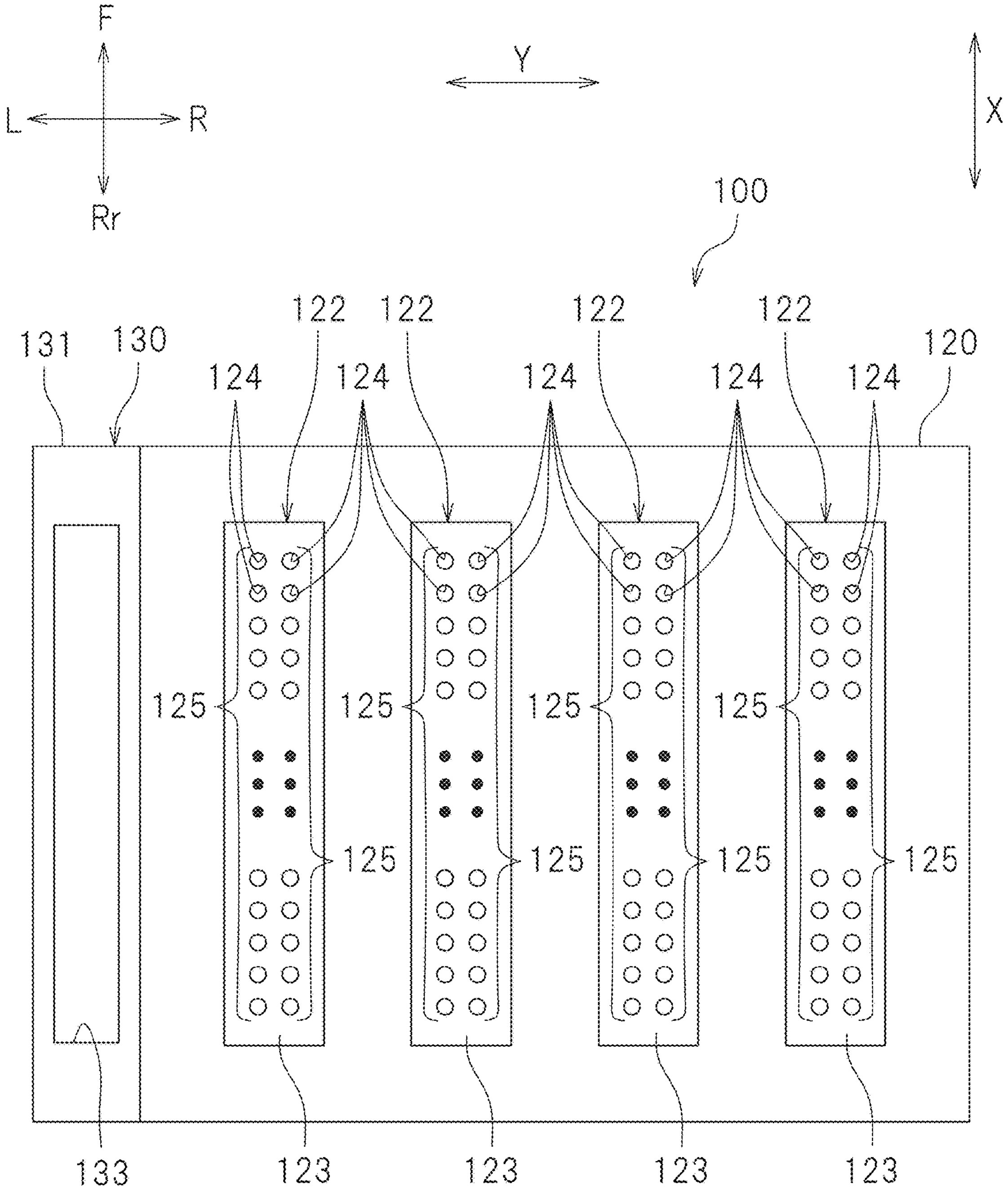
FIG. 5 is a bottom view of a carriage, ink heads, and a light applicator.

FIG. 5 is a bottom view of the carriage 120, the ink heads 122, and the light applicator 130. As illustrated in FIG. 5, the ink heads 122 each include a nozzle surface 123. The nozzle surfaces 123 define the bottom surfaces of the ink heads 122. The nozzle surfaces 123 are exposed downward from the carriage 120. Each of the nozzle surfaces 123 is provided with a plurality of nozzles 124. In the present preferred embodiment, the nozzles 124 of each of the nozzle surfaces 123 are disposed in alignment with each other in the sub-scanning direction X. A row of the nozzles 124 in alignment with each other in the sub-scanning direction X will hereinafter be referred to as a "nozzle row 125". In the present preferred embodiment, the number of nozzle rows 125 in each of the nozzle surfaces 123 is two, for example. Alternatively, the number of nozzle rows 125 in each of the nozzle surfaces 123 may be one or may be three or more.

In the present preferred embodiment, ink to be discharged from the nozzles 124 differs in color for each of the nozzle rows 125 of the ink heads 122. The ink to be discharged from the nozzles 124 is, for example, color ink or spot color ink. As used herein, the term "color ink" refers to process color ink. Examples of process color ink include cyan ink, magenta ink, yellow ink, and black ink. As used herein, the term "spot color ink" refers to ink of color other than those of process color ink. Spot color ink includes underlying ink. Examples of underlying ink include primer ink and white ink. Examples of spot color ink further include clear ink, gloss ink, fluorescent ink, metallic ink, orange ink, red ink, violet ink, blue ink, and green ink.

In the present preferred embodiment, the ink head(s) 122 to discharge clear ink is/are example(s) of a first ink head according to a preferred embodiment of the present invention. The ink head(s) 122 to discharge color ink is/are example(s) of a second ink head according to a preferred embodiment of the present invention.

The ink to be discharged from the nozzles 124 of the ink heads 122 is photo-curable ink whose drying is promoted by exposure to light. Examples of light include ultraviolet light. The ink used in this preferred embodiment is, for example, ultraviolet-curable ink whose drying is promoted by exposure to ultraviolet light. Alternatively, any other suitable type of ink, such as water-based ink, may be used.

In the present preferred embodiment, the ink to be discharged from the ink heads 122 is stored in ink cartridges 126 illustrated in FIG. 3. The ink cartridges 126 are disposed, for example, in the internal space of the case 111. The ink cartridges 126 are each connected to, for example, an associated one of the ink heads 122. Alternatively, the ink cartridges 126 may each be connected to an associated one of the nozzle rows 125. The ink cartridges 126 are connected to the ink heads 122 through, for example, tubes (not illustrated). The ink stored in the ink cartridges 126 is supplied to the ink heads 122 through the tubes.

The light applicator 130 applies light to the ink discharged from the nozzles 124 of the ink heads 122. The light applicator 130 is able to apply light to the ink discharged onto or toward the medium 10 supported by the support table 140. In the present preferred embodiment, the ink discharged from the nozzles 124 is ultraviolet-curable ink as previously mentioned. The light applicator 130 is thus preferably an ultraviolet light applicator to apply ultraviolet light to the ink discharged from the nozzles 124. Alternatively, the light applicator 130 may be an infrared light applicator to apply infrared light to the ink discharged from the nozzles 124. In this case, the ink discharged from the nozzles 124 of the ink heads 122 may be "water-based ink".

As illustrated in FIG. 5, the light applicator 130 is provided on the carriage 120. The light applicator 130 is movable in the main scanning direction Y together with the carriage 120 and the ink heads 122. In the present preferred embodiment, the light applicator 130 is disposed on a first side in the main scanning direction Y relative to the carriage 120 and the ink heads 122. In the example illustrated in FIG. 5, the light applicator 130 is disposed leftward of the carriage 120 and the ink heads 122. Alternatively, the light applicator 130 may be disposed on a second side in the main scanning direction Y relative to the carriage 120 and the ink heads 122. In this case, the light applicator 130 may be disposed rightward of the carriage 120 and the ink heads 122. In FIG. 5, the printer 100 is illustrated as including one light applicator 130. Alternatively, the printer 100 may include more than one light applicator 130 (e.g., two light applicators 130). In this case, one or more light applicators 130 may be provided on the right portion of the carriage 120, and one or more light applicators 130 may be provided on the left portion of the carriage 120.

The light applicator 130 is not limited to any particular configuration, structure, or arrangement. In the present preferred embodiment, the light applicator 130 includes an applicator body 131 (see FIG. 5) and a light source 132 (see FIG. 4). As illustrated in FIG. 5, the applicator body 131 has, for example, a cuboidal shape. The applicator body 131 is hollow. The applicator body 131 includes a bottom surface provided with an application hole 133. The application hole 133 has a rectangular shape. Alternatively, the application hole 133 may have any other suitable shape. The light source 132 emits light (which is ultraviolet light in this preferred embodiment). The light source 132 is disposed inside the applicator body 131. The light emitted from the light source 132 passes through the application hole 133 and is applied to the ink discharged onto or toward the medium 10.

As illustrated in FIG. 3, the support table 140 supports the medium 10. In this preferred embodiment, the medium 10 is placed on the upper surface of the support table 140. The printer 100 effects printing on or over the medium 10 placed on the support table 140. The upper surface of the support table 140 extends in the main scanning direction Y and the sub-scanning direction X.

In the present preferred embodiment, the printer 100 includes a conveyor 150 as illustrated in FIG. 3. The conveyor 150 moves the ink heads 122 three-dimensionally relative to the medium 10 supported by the support table 140. The conveyor 150 is not limited to any particular configuration, structure, or arrangement. In this preferred embodiment, the conveyor 150 includes a head conveyor 151 and a medium conveyor 152.

The head conveyor 151 moves the ink heads 122 relative to the support table 140 in the main scanning direction Y. In this preferred embodiment, the head conveyor 151 moves the carriage 120, the ink heads 122, and the light applicator 130 in the main scanning direction Y along the guide rail 118.

The head conveyor 151 is not limited to any particular configuration, structure, or arrangement. Although not illustrated, the head conveyor 151 in the present preferred embodiment includes, for example, right and left pulleys, a belt, and a scan motor. The left pulley is provided around the left end of the guide rail 118. The right pulley is provided around the right end of the guide rail 118. The belt is, for example, an endless belt. The belt is wound around the right and left pulleys. The carriage 120 is secured to the belt. The scan motor is connected to one of the right and left pulleys. In this preferred embodiment, driving the scan motor rotates the pulleys so as to cause the belt to run between the right and left pulleys. The running of the belt moves the carriage 120, the ink heads 122, and the light applicator 130 in the main scanning direction Y along the guide rail 118.

The medium conveyor 152 moves the medium 10, which is supported by the support table 140, relative to the ink heads 122 in the sub-scanning direction X. In the present preferred embodiment, the medium conveyor 152 moves the support table 140 in the sub-scanning direction X so as to move the medium 10, which is supported by the support table 140, in the sub-scanning direction X.

The medium conveyor 152 is not limited to any particular configuration, structure, or arrangement. Although not illustrated, the medium conveyor 152 in this preferred embodiment includes a support table carriage and a pair of right and left slide rails. The support table carriage supports the support table 140. The slide rails support the support table carriage such that the support table carriage is slidable along the slide rails. The slide rails extend in the sub-scanning direction X. Although not illustrated, the medium conveyor 152 further includes a pair of front and rear slide pulleys and a slide belt. The front slide pulley is provided in front of the slide rails. The rear slide pulley is provided behind the slide rails. The slide belt is wound around the front and rear slide pulleys. The support table carriage is secured to the slide belt. A feed motor is connected to one of the front and rear slide pulleys. In this preferred embodiment, driving the feed motor causes the slide belt to run so as to move the support table 140 and the medium 10 in the sub-scanning direction X together with the support table carriage.

Although not described in detail, the conveyor 150 of the printer 100 in the present preferred embodiment includes a raising and lowering device 153 to raise and lower the support table 140 and the medium 10 as illustrated in FIG. 3.

The printer 100 includes a controller 160. The controller 160 is configured or programmed to perform processes related to printing. In the present preferred embodiment, the controller 160 is configured or programmed to exercise control so as to print the first print layer 11 (see FIG. 1) on the medium 10 and print the second print layer 12 (see FIG. 1) on the first print layer 11. The controller 160 is not limited to any particular configuration. The controller 160 is, for example, a microcomputer. The controller 160 includes, for example, an interface (I/F), a central processing unit (CPU), a read-only memory (ROM), and a random-access memory (RAM). The controller 160 is provided inside the case 111. Alternatively, the controller 160 may be implemented by, for example, a computer disposed outside the case 111. In this case, the controller 160 is connected to a control board (not illustrated) of the printer 100 so as to enable wire or wireless communication between the controller 160 and the printer 100.

As illustrated in FIG. 4, the controller 160 in the present preferred embodiment is communicably connected to the ink heads 122, the light applicator 130 (or more specifically, the light source 132), and the conveyor 150 (or more specifically, the head conveyor 151, the medium conveyor 152, and the raising and lowering device 153). The controller 160 controls the ink heads 122, the light applicator 130, and the conveyor 150.

Figure 6:
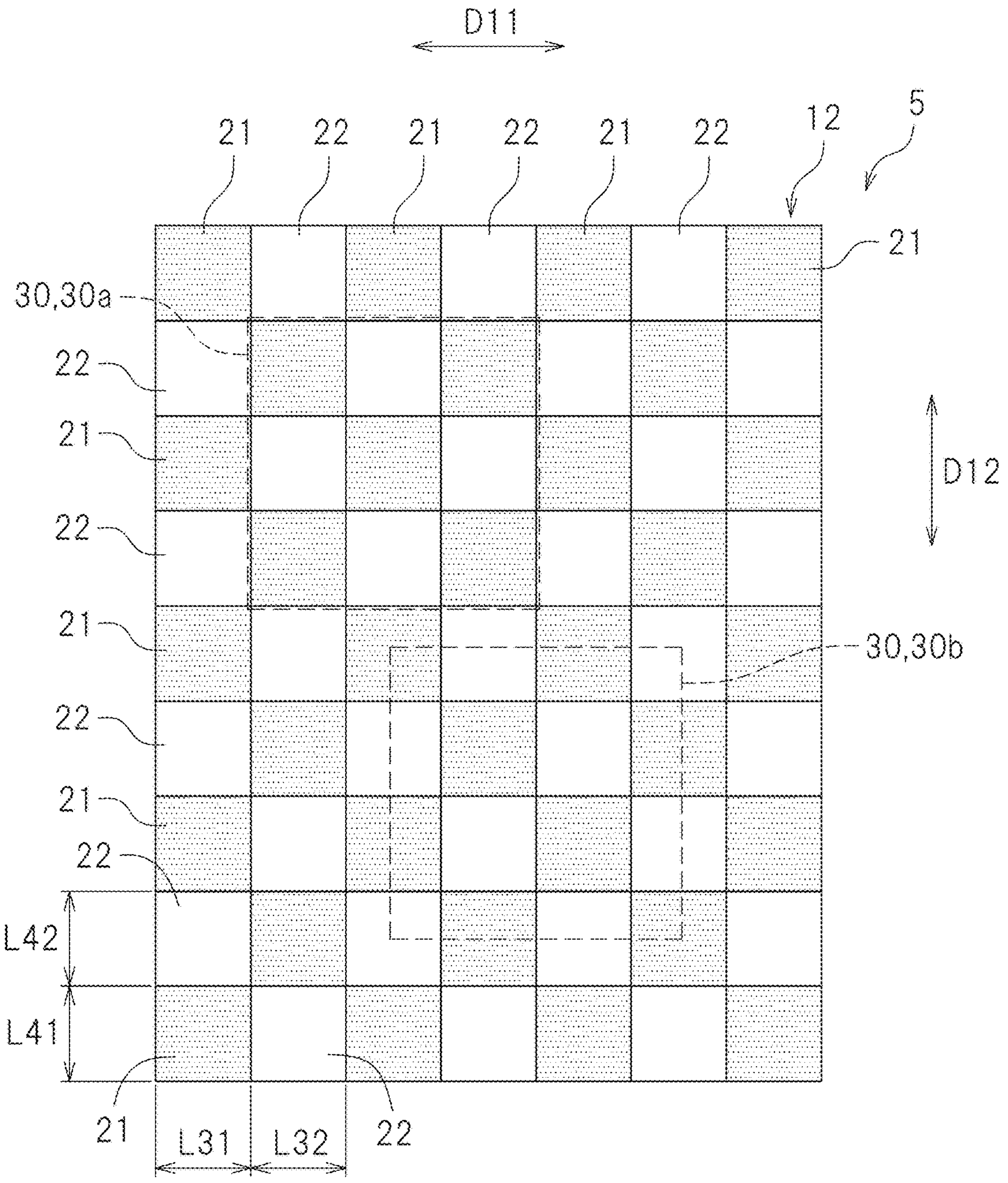
FIG. 6 is a plan view of a second print layer of the printed matter according to the first preferred embodiment of the present invention.
Figure 7:
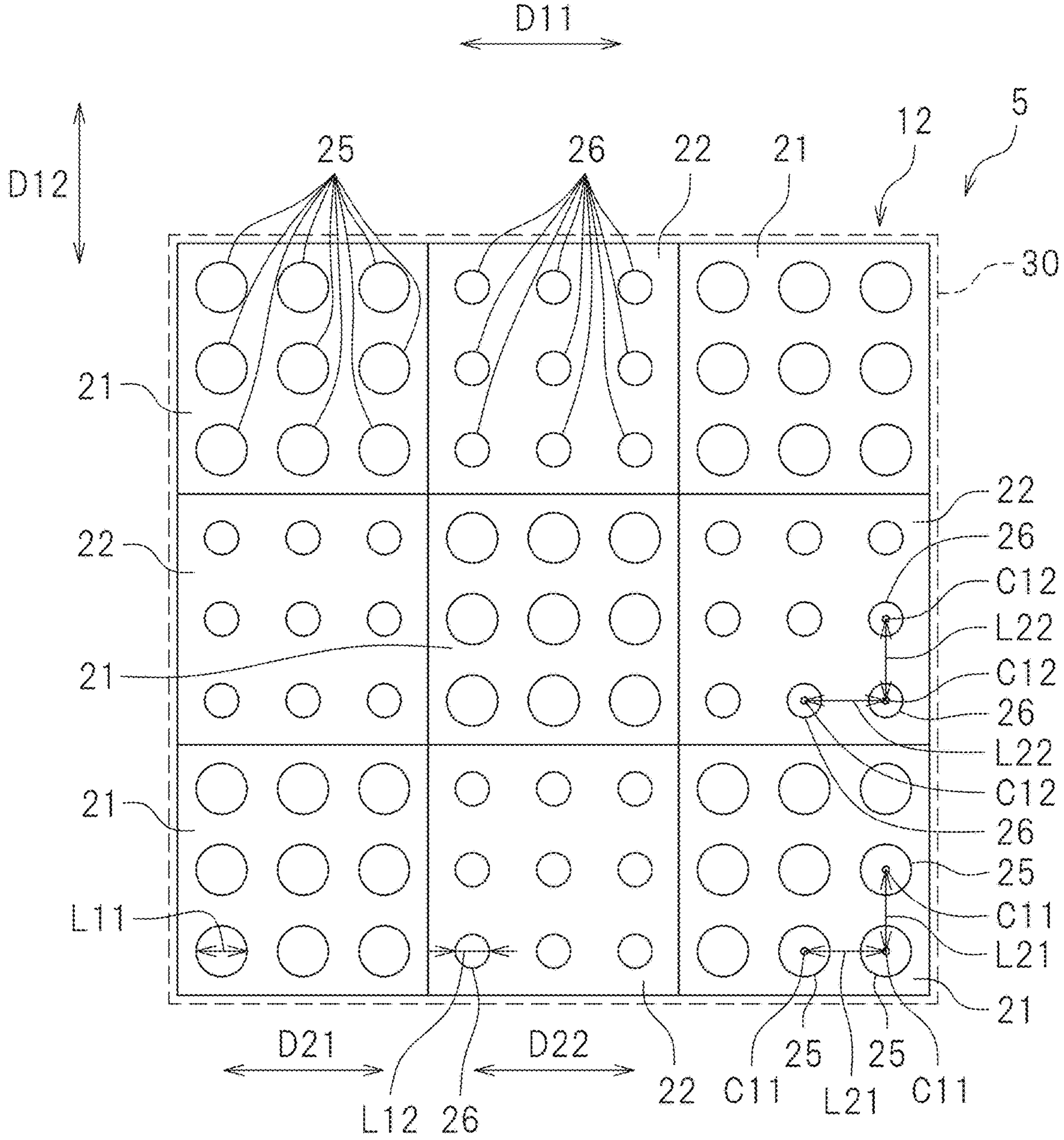
FIG. 7 is a plan view of an extracted area extracted from the second print layer.

The above description has discussed the structure of the printer 100 to print the first and second print layers 11 and 12 of the printed matter 5 according to the present preferred embodiment. The second print layer 12 of the printed matter 5 to be produced by the printer 100 according to the present preferred embodiment will now be described in detail. FIG. 6 is a plan view of the second print layer 12 of the printed matter 5. FIG. 7 is a plan view of an extracted area 30 extracted from the second print layer 12 of the printed matter 5. In the drawings related to the printed matters, the reference sign "D11" represents a first direction, and the reference sign "D12" represents a second direction. The first direction D11 and the second direction D12 intersect with each other in plan view. In this preferred embodiment, the first direction D11 and the second direction D12 are perpendicular or substantially perpendicular to each other in plan view. The first direction D11 and the second direction D12, however, are defined merely for the sake of convenience of description. The first direction D11 and the second direction D12 do not limit in any way how the printed matters may be disposed or oriented.

As illustrated in FIG. 1, the second print layer 12 in the present preferred embodiment is printed over the medium 10 as mentioned above. The second print layer 12 is formed by using, for example, clear ink. The second print layer 12 defines a surface of the printed matter 5 (which is the uppermost surface of the printed matter 5 in this preferred embodiment). The second print layer 12 is exposed to the outside of the printed matter 5. The second print layer 12 may be a tactile texture providing layer that provides a tactile texture to the printed matter 5. The second print layer 12 is provided with projections and depressions. The second print layer 12 thus forms projections and depressions on the surface of the printed matter 5. The user touches the second print layer 12, for example, by touching the surface of the printed matter 5 with his or her fingertip. This allows the user to feel the tactile texture of the printed matter 5 with his or her fingertip. In this preferred embodiment, changing the intervals between the projections and depressions of the second print layer 12 and/or the sizes of the projections and depressions of the second print layer 12 makes it possible to present various types of tactile textures.

In the present preferred embodiment, the second print layer 12 includes first print regions 21 and second print regions 22. In FIG. 6, the first print regions 21 are shaded to facilitate differentiation between the first and second print regions 21 and 22. The present preferred embodiment enables a tactile texture provided by the first print regions 21 to differ from a tactile texture provided by the second print regions 22 when the printed matter 5 is touched with a fingertip. As illustrated in FIG. 7, each of the first print regions 21 includes a plurality of first protrusions 25, and each of the second print regions 22 includes a plurality of second protrusions 26. In the drawings in which the first print regions are shaded, the first and second protrusions are not illustrated.

In the present preferred embodiment, the first and second protrusions 25 and 26 protrude upward above the medium 10 as illustrated in FIG. 1. As illustrated in FIG. 7, the first protrusions 25 are similar in size, height H11 (see FIG. 1), planar shape, and lateral shape. Alternatively, some of the first protrusions 25 may be different in size, height H11, planar shape, and/or lateral shape from the other first protrusions 25. The second protrusions 26 are similar in size, height H12 (see FIG. 1), planar shape, and lateral shape. Alternatively, some of the second protrusions 26 may be different in size, height H12, planar shape, and/or lateral shape from the other second protrusions 26.

In the present preferred embodiment, any one or more of the size, height H11, planar shape, arrangement interval L21, and arrangement direction D21 of the first protrusions 25 in each first print region 21 is/are different from a corresponding one or more of the size, height H12, planar shape, arrangement interval L22, and arrangement direction D22 of the second protrusions 26 in each second print region 22. This enables the tactile texture of the first print regions 21 to differ from the tactile texture of the second print regions 22. In the present preferred embodiment, the first protrusions 25 are different in size from the second protrusions 26. As used herein, the term "size" refers to at least one or more of an area in plan view, a volume, and a maximum dimension in plan view.

In the present preferred embodiment, the first protrusions 25 are larger than the second protrusions 26. Maximum dimensions L11 of the first protrusions 25 (which are the diameters of the first protrusions 25 in this preferred embodiment) are greater than maximum dimensions L12 of the second protrusions 26 (which are the diameters of the second protrusions 26 in this preferred embodiment). The first protrusions 25 are larger in area than the second protrusions 26 in plan view. The first protrusions 25 are larger in volume than the second protrusions 26. Alternatively, the first protrusions 25 may be smaller than or similar in size to the second protrusions 26. In one example, the maximum dimensions L11 of the first protrusions 25 may be smaller than or equal to the maximum dimensions L12 of the second protrusions 26.

In the present preferred embodiment, the maximum dimensions L11 of the first protrusions 25 and the maximum dimensions L12 of the second protrusions 26 in plan view are about 1 mm or less, preferably about 0.8 mm or less, and particularly preferably about 0.6 mm or less.

In the present preferred embodiment, the height H11, planar shape, arrangement interval L21, and arrangement direction D21 of the first protrusions 25 are respectively similar to the height H12, planar shape, arrangement interval L22, and arrangement direction D22 of the second protrusions 26. As illustrated in FIG. 1, the height H11 of the first protrusions 25, for example, is similar to the height H12 of the second protrusions 26. In this preferred embodiment, the height H11 of the first protrusions 25 and the height H12 of the second protrusions 26 are about 10 mm or less, preferably about 8 mm or less, and particularly preferably about 6 mm or less.

As illustrated in FIG. 7, the planar shapes of the first and second protrusions 25 and 26 are both circular. The planar shapes of the first and second protrusions 25 and 26, however, do not necessarily have to be circular. Alternatively, the planar shapes of the first and second protrusions 25 and 26 may be polygonal (e.g., triangular or rectangular), elliptical, or annular. In this preferred embodiment, the lateral shapes of the first and second protrusions 25 and 26 are semicircular as illustrated in FIG. 1. Alternatively, the first and second protrusions 25 and 26 may have any other suitable lateral shapes. The lateral shapes of the first and second protrusions 25 and 26 may be polygonal (e.g., rectangular or triangular).

In the present preferred embodiment, the arrangement intervals L21 between the first protrusions 25 are similar to the arrangement intervals L22 between the second protrusions 26 as illustrated in FIG. 7. As used herein, the term "arrangement interval L21" refers to a distance between centers C11 of the first protrusions 25 adjacent to each other in the first direction D11 or the second direction D12. As used herein, the term "arrangement interval L22" refers to a distance between centers C12 of the second protrusions 26 adjacent to each other in the first direction D11 or the second direction D12. In the present preferred embodiment, the first protrusions 25 are arranged regularly. The first protrusions 25 are disposed, for example, at regular intervals. The second protrusions 26 are also arranged regularly. The second protrusions 26 are disposed, for example, at regular intervals. Alternatively, the arrangement intervals L21 between some of the first protrusions 25 may be different from the arrangement intervals L21 between the other first protrusions 25, and/or the arrangement intervals L22 between some of the second protrusions 26 may be different from the arrangement intervals L22 between the other second protrusions 26.

Intervals between the first protrusions 25 adjacent to each other (which are the arrangement intervals L21 between the first protrusions 25 in this preferred embodiment) and intervals between the second protrusions 26 adjacent to each other (which are the arrangement intervals L22 between the second protrusions 26 in this preferred embodiment) are about 2 mm or less, preferably about 1.8 mm or less, and particularly preferably about 1.6 mm or less. The arrangement intervals L21 between the first protrusions 25 and the arrangement intervals L22 between the second protrusions 26 are about 20 μm or more, preferably about 30 μm or more, and particularly preferably about 50 μm or more.

The arrangement direction D21 of the first protrusions 25 corresponds to the arrangement direction D22 of the second protrusions 26. In the present preferred embodiment, the arrangement directions D21 and D22 correspond to the first direction D11. In other words, the first protrusions 25 are arranged in the first direction D11, and the second protrusions 26 are also arranged in the first direction D11. In this preferred embodiment, the first protrusions 25 are disposed at regular intervals in the first direction D11 and the second direction D12, and the second protrusions 26 are disposed at regular intervals in the first direction D11 and the second direction D12. Thus, the first protrusions 25 and the second protrusions 26 may also be arranged in the second direction D12. Accordingly, the arrangement direction D21 of the first protrusions 25 and the arrangement direction D22 of the second protrusions 26 may also correspond to the second direction D12. The arrangement direction D21 and the arrangement direction D22 are not limited to the first direction D11 or the second direction D12. Alternatively, the arrangement direction D21 and the arrangement direction D22 may be, for example, directions inclined relative to the first direction D11 or the second direction D12.

In the present preferred embodiment, each of the first print regions 21 may include any suitable number of first protrusions 25, and each of the second print regions 22 may include any suitable number of second protrusions 26. In this preferred embodiment, the number of first protrusions 25 in each of the first print regions 21 is equal to the number of second protrusions 26 in each of the second print regions 22. Alternatively, the number of first protrusions 25 in each of the first print regions 21 may be different from the number of second protrusions 26 in each of the second print regions 22. In the present preferred embodiment, the number of first protrusions 25 per unit area of each of the first print regions 21 is equal to the number of second protrusions 26 per unit area of each of the second print regions 22. Alternatively, the number of first protrusions 25 per unit area of each of the first print regions 21 may be different from the number of second protrusions 26 per unit area of each of the second print regions 22.

In the present preferred embodiment, no ink is discharged onto portions of the first print regions 21 where no first protrusions 25 are provided, and the first print layer 11 is thus exposed through the portions of the first print regions 21. Similarly, no ink is discharged onto portions of the second print regions 22 where no second protrusions 26 are provided, and the first print layer 11 is thus exposed through the portions of the second print regions 22. Alternatively, layer(s) made of ink (e.g., clear ink), which is/are layer(s) lower in height than the first protrusions 25 in this preferred embodiment, may be formed in portions of the first print regions 21 where no first protrusions 25 are provided. Similarly, layer(s) made of ink (e.g., clear ink), which is/are layer(s) lower in height than the second protrusions 26 in this preferred embodiment, may be formed in portions of the second print regions 22 where no second protrusions 26 are provided.

The following description discusses the relationships between the first and second print regions 21 and 22, such as the relative positions and sizes of the first and second print regions 21 and 22. As illustrated in FIG. 6, the second print layer 12 in the present preferred embodiment includes more than one first print region 21 and more than one second print region 22. The first print regions 21 are similar in size (e.g., area, length in the first direction D11, and length in the second direction D12). The second print regions 22 are also similar in size. Alternatively, some of the first print regions 21 may be different in size from the other first print regions 21. Similarly, some of the second print regions 22 may be different in size from the other second print regions 22.

The first and second print regions 21 and 22 may each have, for example, an area of about 400 $\mu m^2$ or more, preferably about 500 $\mu m^2$ or more, and particularly preferably about 600 $\mu m^2$ or more.

In the present preferred embodiment, the first print regions 21 are similar in shape, and the second print regions 22 are also similar in shape. Alternatively, some of the first print regions 21 may be different in shape from the other first print regions 21. Similarly, some of the second print regions 22 may be different in shape from the other second print regions 22.

In the present preferred embodiment, the first print regions 21 are similar in size and shape to the second print regions 22. In this preferred embodiment, the first and second print regions 21 and 22 each have a polygonal shape, such as a rectangular shape. Specifically, the first and second print regions 21 and 22 each have a square shape. Alternatively, the first print regions 21 may be different in shape from the second print regions 22. The first and second print regions 21 and 22 may each have any suitable shape other than a polygonal shape.

In the present preferred embodiment, a length L31 of each of the first print regions 21 in the first direction D11 is equal to a length L32 of each of the second print regions 22 in the first direction D11. A length L41 of each of the first print regions 21 in the second direction D12 is equal to a length L42 of each of the second print regions 22 in the second direction D12. The area of each of the first print regions 21 is equal to the area of each of the second print regions 22. Alternatively, the first print regions 21 may be different in size from the second print regions 22. In other words, the length L31 of each of the first print regions 21 in the first direction D11 may be different from the length L32 of each of the second print regions 22 in the first direction D11. The length L41 of each of the first print regions 21 in the second direction D12 may be different from the length L42 of each of the second print regions 22 in the second direction D12. The first print regions 21 may be different in area from the second print regions 22.

The first print regions 21 are spaced away from each other in the first direction D11 and spaced away from each other in the second direction D12. Similarly, the second print regions 22 are spaced away from each other in the first direction D11 and spaced away from each other in the second direction D12. In the present preferred embodiment, the first and second print regions 21 and 22 are disposed alternately. Specifically, the first and second print regions 21 and 22 are disposed alternately in the first direction D11 and disposed alternately in the second direction D12.

In the present preferred embodiment, some of the regions are extracted from the second print layer 12, and the extracted regions will be referred to as the "extracted area 30". The extracted area 30 may be extracted from any location in the second print layer 12. As illustrated in FIG. 6, the extracted area 30 may be extracted from, for example, a location 30*a* or a location 30*b* in the second print layer 12. The extracted area 30 extracted from the location 30*a* will hereinafter be referred to as an "extracted area 30*a*". The extracted area 30 extracted from the location 30*b* will hereinafter be referred to as an "extracted area 30*b*".

The extracted area 30 is about 3 cm by about 3 cm, for example. The extracted area 30 according to the present preferred embodiment has a length of about 3 cm in the first direction D11 and a length of about 3 cm in the second direction D12. The size of the extracted area 30 approximately corresponds to the area of contact of a fingertip with the printed matter 5 when the printed matter 5 is touched with the fingertip. When the user touches the printed matter 5 with his or her finger, for example, the user often uses his or her index finger or, in particular, the pad of the tip of the index finger above its first joint (e.g., a portion of the tip of the index finger opposite to the nail). The area of the pad of an adult's index finger may be in the range of about 3 cm by about 3 cm, for example. Accordingly, assuming that the printed matter 5 is to be touched with the pad of an adult's index finger, the size of the extracted area 30 is about 3 cm by about 3 cm, for example.

In the present preferred embodiment, the first and second print regions 21 and 22 are both disposed in one extracted area 30 as illustrated in FIG. 7. At least either the number of first print regions 21 or the number of second print regions 22 disposed in one extracted area 30 is more than one. In the present preferred embodiment, the number of first print regions 21 disposed in one extracted area 30 is more than one, and the number of second print regions 22 disposed in one extracted area 30 is also more than one. For example, suppose that portion(s) of the first print region(s) 21 and/or portion(s) of the second print region(s) 22 is/are disposed in the extracted area 30 (see, for example, the extracted area 30*b* illustrated in FIG. 6). In this case, the portion(s) of the first print region(s) 21 is/are counted among the number of first print region(s) 21, and/or the portion(s) of the second print region(s) 22 is/are counted among the number of second print regions 22.

Figure 8:
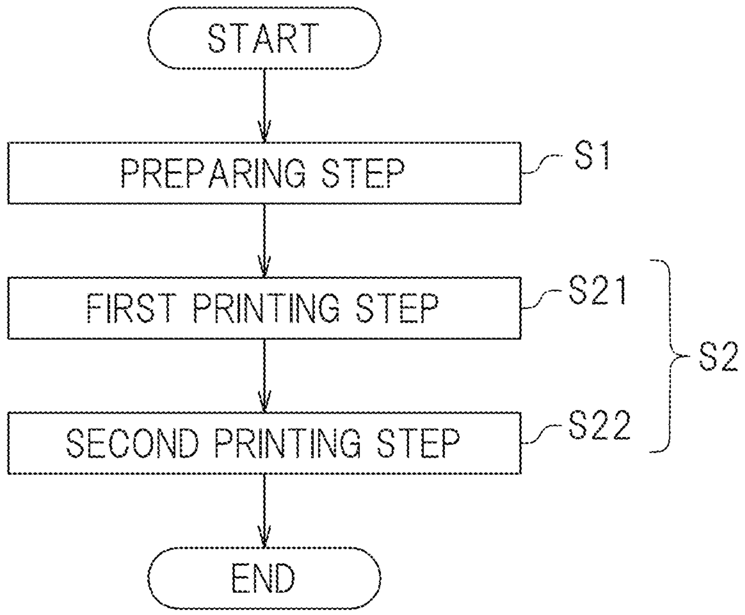
FIG. 8 is a flowchart of a printing method.

A printing method according to the present preferred embodiment will now be described with reference to the flowchart of FIG. 8. The printing method according to the present preferred embodiment is performed using the printer 100 illustrated in FIG. 2. The printing method in this preferred embodiment is a method for printing the first print layer 11 on the medium 10 and printing the second print layer 12 on the first print layer 11 as illustrated in FIG. 1. As illustrated in FIG. 8, the printing method includes a preparing step S1 and a printing step S2.

First, the preparing step S1 involves preparing the medium 10 on which the first print layer 11 is to be printed and over which the second print layer 12 is to be printed. As used herein, the term "preparing the medium 10" refers to making the medium 10 ready for printing to be performed by the printer 100. In this preferred embodiment, preparing the medium 10 involves supporting the medium 10 with the support table 140 of the printer 100 as illustrated in FIG. 3. In one example, the medium 10 is placed on the support table 140.

After the medium 10 has been prepared in the preparing step S1 illustrated in FIG. 8, the printing step S2 is performed. The printing step S2 involves performing printing on or over the medium 10 by using the printer 100. In the present preferred embodiment, the printing step S2 includes a first printing step S21 and a second printing step S22.

First, the first printing step S21 included in the printing step S2 involves printing the first print layer 11 (see FIG. 1) on the medium 10. The controller 160 of the printer 100 is configured or programmed to actuate the head conveyor 151 so as to move the ink heads 122 in the main scanning direction Y. During the movement of the ink heads 122 in the main scanning direction Y, the controller 160 is configured or programmed to cause the ink heads 122 to discharge ink (e.g., underlying ink) onto the medium 10 so as to perform single-line printing for the first print layer 11. After the single-line printing has been performed, the controller 160 is configured or programmed to control the medium conveyor 152 so as to move the support table 140, which supports the medium 10, in the sub-scanning direction X by a predetermined distance. The controller 160 is configured or programmed to then move the ink heads 122 in the main scanning direction Y so as to perform next single-line printing for the first print layer 11 on the medium 10. Alternately repeating single-line printing for the first print layer 11 and movement of the support table 140 in the sub-scanning direction X in this manner prints the first print layer 11 on the medium 10.

After the first print layer 11 has been printed in the first printing step S21, the second printing step S22 illustrated in FIG. 8 is performed. The second printing step S22 involves printing the second print layer 12 (see FIG. 1) over the medium 10. In this preferred embodiment, the second print layer 12 is printed on the first print layer 11 such that the second print layer 12 overlaps with the first print layer 11 printed on the medium 10. The second printing step S22 involves printing the first protrusions 25 of the first print regions 21 and the second protrusions 26 of the second print regions 22 over the medium 10. A memory of the controller 160 stores, for example, image data including images of the first print regions 21 (e.g., the first protrusions 25) and the second print regions 22 (e.g., the second protrusions 26) of the second print layer 12. The second printing step S22 involves reading the image data from the memory so as to print the second print layer 12 in accordance with the image data.

In the second printing step S22, the controller 160 of the printer 100 is configured or programmed to actuate the head conveyor 151 so as to move the ink heads 122 in the main scanning direction Y. During the movement of the ink heads 122 in the main scanning direction Y, the controller 160 is configured or programmed to cause the ink heads 122 to discharge ink (e.g., clear ink) toward the medium 10 so as to perform single-line printing for the second print layer 12. After the single-line printing has been performed, the controller 160 is configured or programmed to control the medium conveyor 152 so as to move the support table 140, which supports the medium 10, in the sub-scanning direction X by a predetermined distance. The controller 160 is configured or programmed to then move the ink heads 122 in the main scanning direction Y so as to perform next single-line printing for the second print layer 12 over the medium 10. Alternately repeating single-line printing for the second print layer 12 and movement of the support table 140 in the sub-scanning direction X in this manner prints the second print layer 12 over the medium 10. Performing the above-described steps produces the printed matter 5.

As illustrated in FIG. 3, the printer 100 in the present preferred embodiment includes the support table 140 to support the medium 10, the ink heads 122 to discharge ink onto or toward the medium 10 supported by the support table 140; the conveyor 150 to move the ink heads 122 relative to the medium 10 supported by the support table 140, and the controller 160 configured or programmed to exercise control so as to print the first print layer 11 on the medium 10 and print the second print layer 12 on the first print layer 11. The printer 100 produces the printed matter 5 (see FIG. 1). As illustrated in FIG. 1, the printed matter 5 includes the medium 10 and the second print layer 12 formed over the medium 10. The second print layer 12 is made of ink. As illustrated in FIG. 7, the second print layer 12 includes: the first print regions 21 each including the first protrusions 25, and the second print regions 22 each including the second protrusions 26. Any one or more of the size, height H11 (see FIG. 1), planar shape, arrangement interval L21, and arrangement direction D21 of the first protrusions 25 in each of the first print regions 21 is/are different from a corresponding one or more of the size, height H12 (see FIG. 1), planar shape, arrangement interval L22, and arrangement direction D22 of the second protrusions 26 in each of the second print regions 22. When the extracted area 30, which is about 3 cm by about 3 cm, for example, is extracted from any location in the second print layer 12 as illustrated in FIG. 6, the first and second print regions 21 and 22 are disposed in the extracted area 30 as illustrated in FIG. 7. At least either the number of first print regions 21 or the number of second print regions 22 in the extracted area 30 is more than one.

FIG. 9 is a table listing the sizes of the first print regions 21, the second print regions 22, the first protrusions 25, and the second protrusions 26 in Examples 1 to 12. In the present preferred embodiment, the printing method described above is performed using the printer 100 illustrated in FIG. 2, thus producing the printed matters 5 according to Examples 1 to 12 illustrated in FIG. 9. In each of Examples 1 to 12, the first and second protrusions 25 and 26 of the second print layer 12 each have a circular planar shape and a semicircular lateral shape.

In Examples 1 to 3, the length of each of the sides of the first print regions 21 included in the second print layer 12 (i.e., the length L31 of each of the first print regions 21 in the first direction D11 and the length L41 of each of the first print regions 21 in the second direction D12 in FIG. 6) is about 0.5 mm, and the length of each of the sides of the second print regions 22 included in the second print layer 12 (i.e., the length L32 of each of the second print regions 22 in the first direction D11 and the length L42 of each of the second print regions 22 in the second direction D12 in FIG. 6) is about 0.5 mm. As illustrated in FIG. 6, the first and second print regions 21 and 22 are disposed alternately in the first direction D11 and disposed alternately in the second direction D12.

In Example 1, as illustrated in FIG. 9, the maximum dimensions L11 of the first protrusions 25 of the first print regions 21 are about 50 μm, and the arrangement intervals L21 between the first protrusions 25 are about 150 μm. In Example 1, the maximum dimensions L12 of the second protrusions 26 of the second print regions 22 are about 100 μm, and the arrangement intervals L22 between the second protrusions 26 are about 150 μm.

In Example 2, the maximum dimensions L11 of the first protrusions 25 are about 50 μm, and the arrangement intervals L21 between the first protrusions 25 are about 300 μm. In Example 2, the maximum dimensions L12 of the second protrusions 26 are about 250 μm, and the arrangement intervals L22 between the second protrusions 26 are about 300 μm. In Example 3, the maximum dimensions L11 of the first protrusions 25 are about 50 μm, and the arrangement intervals L21 between the first protrusions 25 are about 150 μm. In Example 3, the maximum dimensions L12 of the second protrusions 26 are about 50 μm, and the arrangement intervals L22 between the second protrusions 26 are about 300 μm.

Examples 4, 5, and 6 are respectively similar to Examples 1, 2, and 3 except that each of the sides of the first and second print regions 21 and 22 included in the second print layer 12 has a length of about 1 mm. Examples 7, 8, and 9 are respectively similar to Examples 1, 2, and 3 except that each of the sides of the first and second print regions 21 and 22 included in the second print layer 12 has a length of about 1.5 mm. Examples 10, 11, and 12 are respectively similar to Examples 1, 2, and 3 except that each of the sides of the first and second print regions 21 and 22 included in the second print layer 12 has a length of about 2 mm. The printed matters 5 according to Examples 1 to 12 described above are produced.

In the present preferred embodiment, the size of the extracted area 30 (see FIG. 7), which is about 3 cm by about 3 cm, for example, is decided in accordance with the area of contact of a fingertip with the second print layer 12 when the second print layer 12 is touched with the fingertip. In the present preferred embodiment, the second print layer 12 is printed by the printer 100 such that the first and second print regions 21 and 22 have different tactile textures. In this preferred embodiment, touching the second print layer 12 printed over the medium 10 with a fingertip allows the user to simultaneously touch the first and second print regions 21 and 22 having different tactile textures and to simultaneously touch at least either more than one first print region 21 or more than one second print region 22. Accordingly, the present preferred embodiment involves causing the first and second print regions 21 and 22, which are to be simultaneously touched with a fingertip, to have different tactile textures so as to produce the printed matters 5 having various types of tactile textures.

As illustrated in FIG. 9, for example, comparisons among the printed matters 5 according to Examples 1 to 12 suggest that at least either the first print regions 21 or the second print regions 22 of the printed matters 5 according to Examples 1 to 12 have different tactile textures. Accordingly, the printed matters 5 produced in Examples 1 to 12 provide different tactile textures.

In the present preferred embodiment, as illustrated in FIG. 6, the first print regions 21 are spaced away from each other in the first direction D11 and spaced away from each other in the second direction D12, and the second print regions 22 are spaced away from each other in the first direction D11 and spaced away from each other in the second direction D12. This enables the first and second print regions 21 and 22 having different tactile textures to be scattered through the second print layer 12. Accordingly, the present preferred embodiment is able to present various types of tactile textures by changing the way in which the first and second print regions 21 and 22 are scattered through the second print layer 12.

In the present preferred embodiment, the first and second print regions 21 and 22 are all similar in shape. This enables the first and second print regions 21 and 22 to be scattered continuously and regularly through the second print layer 12.

In the present preferred embodiment, the first and second print regions 21 and 22 are disposed alternately in the first direction D11, and the first and second print regions 21 and 22 are disposed alternately in the second direction D12 intersecting with the first direction D11. This enables the first and second print regions 21 and 22 to be scattered regularly through the second print layer 12 in the first direction D11 and the second direction D12. Accordingly, the user is able to feel the same pattern of touch when moving his or her fingertip along the printed matter 5 in the first direction D11 and when moving his or her fingertip along the printed matter 5 in the second direction D12.

In the present preferred embodiment, the maximum dimensions L11 (see FIG. 7) of the first protrusions 25 (which are the diameters of the first protrusions 25 in this preferred embodiment) and the maximum dimensions L12 (see FIG. 7) of the second protrusions 26 (which are the diameters of the second protrusions 26 in this preferred embodiment) in plan view are 1 mm or less. If the maximum dimensions L11 of the first protrusions 25 and the maximum dimensions L12 of the second protrusions 26 are greater than about 1 mm, the protrusions 25 and 26 may be mistaken for Braille characters. In the present preferred embodiment, however, the maximum dimensions L11 of the first protrusions 25 and the maximum dimensions L12 of the second protrusions 26 are about 1 mm or less. Accordingly, the present preferred embodiment is able to prevent the first and second protrusions 25 and 26 from being mistaken for Braille characters and enables the second print layer 12 to present micro-tactile textures.

In the present preferred embodiment, the arrangement intervals L21 between the first protrusions 25 adjacent to each other and the arrangement intervals L22 between the second protrusions 26 adjacent to each other are about 2 mm or less. If the arrangement intervals L21 between the first protrusions 25 and the arrangement intervals L22 between the second protrusions 26 are longer than about 2 mm, the protrusions 25 are too far away from each other, and the protrusions 26 are too far away from each other, so that the protrusions 25 and 26 may be mistaken for Braille characters. In the present preferred embodiment, however, the arrangement intervals L21 between the first protrusions 25 and the arrangement intervals L22 between the second protrusions 26 are about 2 mm or less. Accordingly, the present preferred embodiment is able to prevent the first and second protrusions 25 and 26 from being mistaken for Braille characters and enables the second print layer 12 to present micro-tactile textures.

In the present preferred embodiment, the arrangement intervals L21 between the first protrusions 25 adjacent to each other and the arrangement intervals L22 between the second protrusions 26 adjacent to each other are about 20 μm or more. If the arrangement intervals L21 between the first protrusions 25 and the arrangement intervals L22 between the second protrusions 26 are too short (e.g., if the arrangement intervals L21 and L22 are less than about 20 μm), the protrusions 25 are too close to each other, and the protrusions 26 are too close to each other, so that the protrusions 25 and 26 may fail to appropriately define projections and depressions. In the present preferred embodiment, however, the arrangement intervals L21 between the first protrusions 25 and the arrangement intervals L22 between the second protrusions 26 are about 20 μm or more. Accordingly, the present preferred embodiment is able to form the first and second protrusions 25 and 26 suitably and define the projections and depressions appropriately.

In the present preferred embodiment, the height H11 (see FIG. 1) of the first protrusions 25 and the height H12 (see FIG. 1) of the second protrusions 26 are about 10 mm or less. If the height H11 of the first protrusions 25 and the height H12 of the second protrusions 26 are too high (e.g., if the height H11 and the height H12 are greater than about 10 mm), the time required for the printer 100 to form the protrusions 25 and 26 may be long. In the present preferred embodiment, however, the height H11 of the first protrusions 25 and the height H12 of the second protrusions 26 are about 10 mm or less. Accordingly, the present preferred embodiment is able to reduce the time required for the printer 100 to form the protrusions 25 and 26.

In the present preferred embodiment, the first and second print regions 21 and 22 each have an area of about 400 $\mu m^2$ or more in plan view. The minimum dot size of ink to be discharged from the nozzles 124 (see FIG. 5) of the printer 100 is, for example, between about 30 μm and about 50 μm. The first and second print regions 21 and 22 thus each have an area of about 400 $\mu m^2$ or more, making it possible to suitably form the first protrusions 25 of the first print regions 21 and the second protrusions 26 of the second print regions 22 by using ink discharged from the nozzles 124 of the printer 100.

In the present preferred embodiment, the controller 160 is configured or programmed to exercise control so as to print the second print layer 12 by discharging clear ink toward the medium 10. In other words, the first and second protrusions 25 and 26 are formed by using clear ink. The first and second protrusions 25 and 26 are formed to provide tactile textures and thus do not need to be visually checked. Accordingly, forming the first and second protrusions 25 and 26 by using clear ink makes the first and second protrusions 25 and 26 difficult to see when the surface of the printed matter 5 is visually checked.

Variations of First Preferred Embodiment

Figure 10:
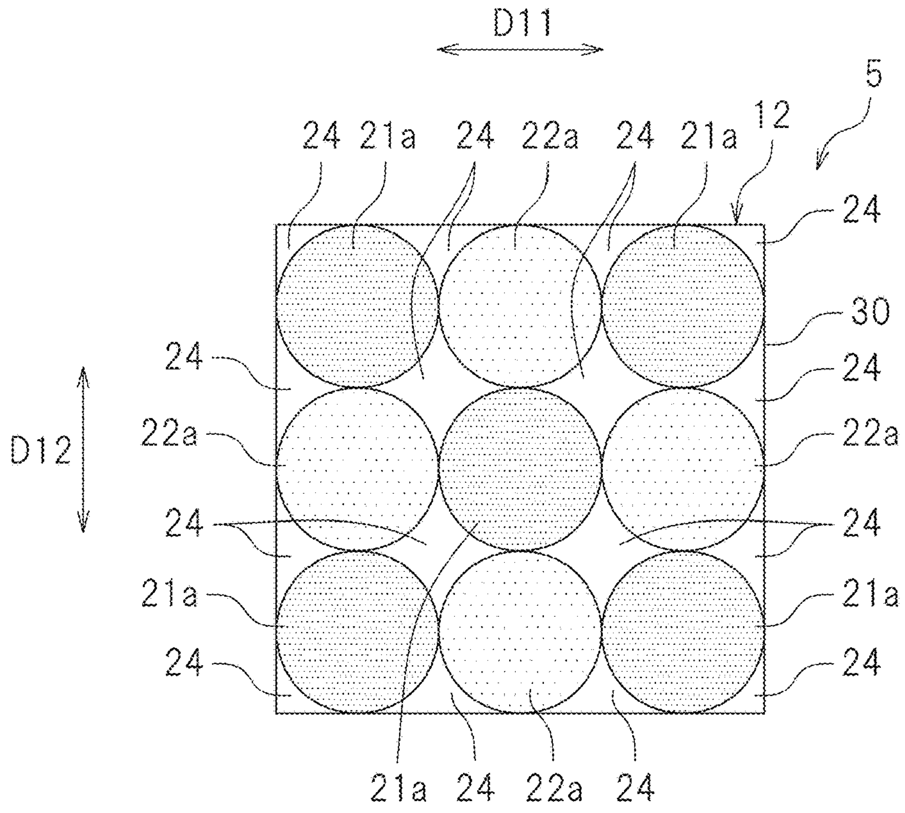
FIG. 10 is a plan view of an extracted area extracted from a second print layer according to a variation of the first preferred embodiment of the present invention.

Variations of the first preferred embodiment will now be described. FIGS. 10 to 13 are plan views respectively illustrating the extracted areas 30 extracted from the second print layers 12 according to first to fourth variations of the first preferred embodiment. In the first preferred embodiment, the first and second print regions 21 and 22 each have a rectangular shape as illustrated in FIG. 7. In the first variation illustrated in FIG. 10, first print regions 21*a* and second print regions 22*a* each have a circular shape. In FIG. 10, no protrusions or other elements are formed in regions 24 (which are regions of the second print layer 12 other than the first and second print regions 21*a* and 22*a*) by using ink, and the first print layer 11 is thus exposed through the regions 24.

Figure 11:
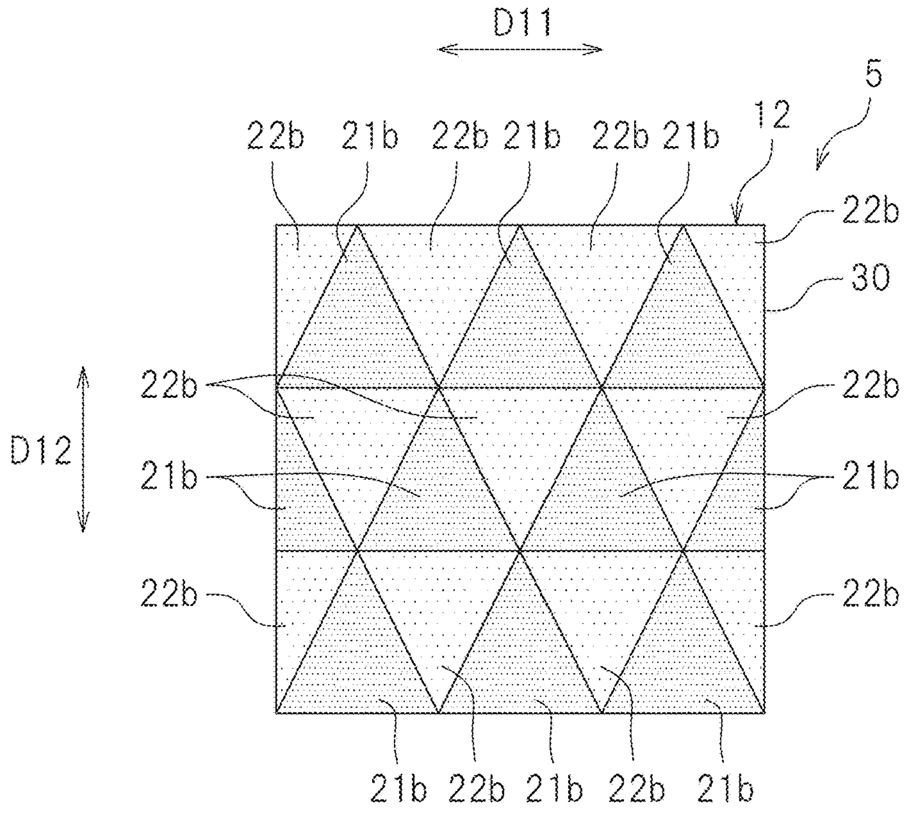
FIG. 11 is a plan view of an extracted area extracted from a second print layer according to another variation of the first preferred embodiment of the present invention.
Figure 12:
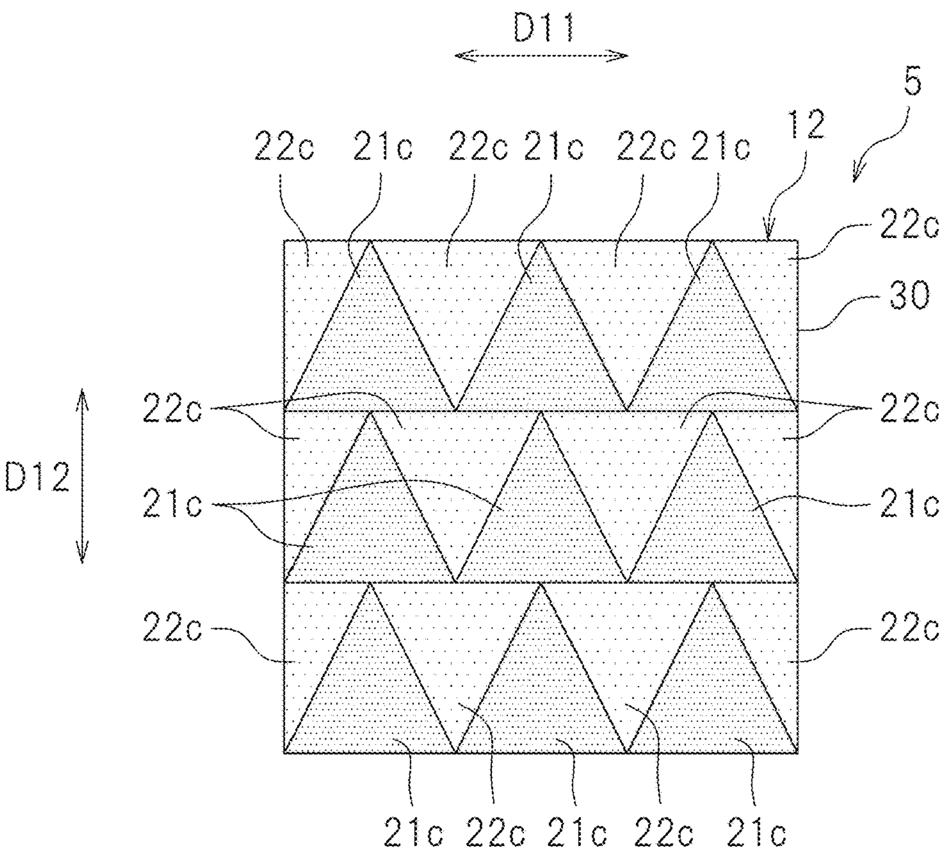
FIG. 12 is a plan view of an extracted area extracted from a second print layer according to still another variation of the first preferred embodiment of the present invention.

In the second variation illustrated in FIG. 11, first print regions 21*b* and second print regions 22*b* each have a triangular shape. In this variation, the first and second print regions 21*b* and 22*b*, each having a triangular shape, are disposed alternately in the first direction D11 and the second direction D12 as illustrated in FIG. 11. In the third variation illustrated in FIG. 12, first print regions 21*c* and second print regions 22*c* each have a triangular shape. As illustrated in FIG. 12, the first and second print regions 21*c* and 22*c*, each having a triangular shape, are disposed alternately in the first direction D11, but the first and second print regions 21*c* and 22*c* are not disposed alternately in the second direction D12. In this variation, the first print regions 21*c* are disposed continuously in the second direction D12, and the second print regions 22*c* are disposed continuously in the second direction D12.

As described above, the first print regions 21, 21*a*, 21*b*, and 21*c* and the second print regions 22, 22*a*, 22*b*, and 22*c* each have a circular shape or a polygonal shape. This makes it possible to provide various types of tactile textures in accordance with the shapes of the first print regions 21, 21*a*, 21*b*, and 21*c* and the second print regions 22, 22*a*, 22*b*, and 22*c*.

Figure 13:
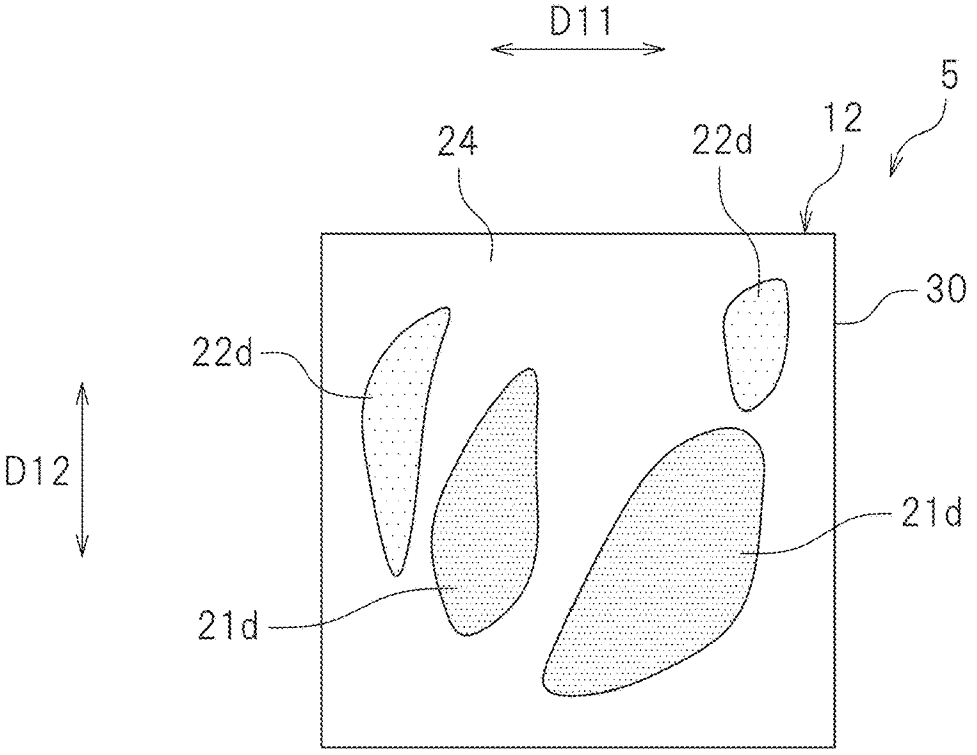
FIG. 13 is a plan view of an extracted area extracted from a second print layer according to yet another variation of the first preferred embodiment of the present invention.

In the first preferred embodiment, the first and second print regions 21 and 22 are similar in shape. In the fourth variation illustrated in FIG. 13, however, first print regions 21*d* have different shapes, and second print regions 22*d* have different shapes. In FIG. 13, no protrusions or other elements are formed in a region 24 (which is a region of the second print layer 12 other than the first and second print regions 21*d* and 22*d*) by using ink, and the first print layer 11 is thus exposed through the region 24.

Second Preferred Embodiment

Figure 14:
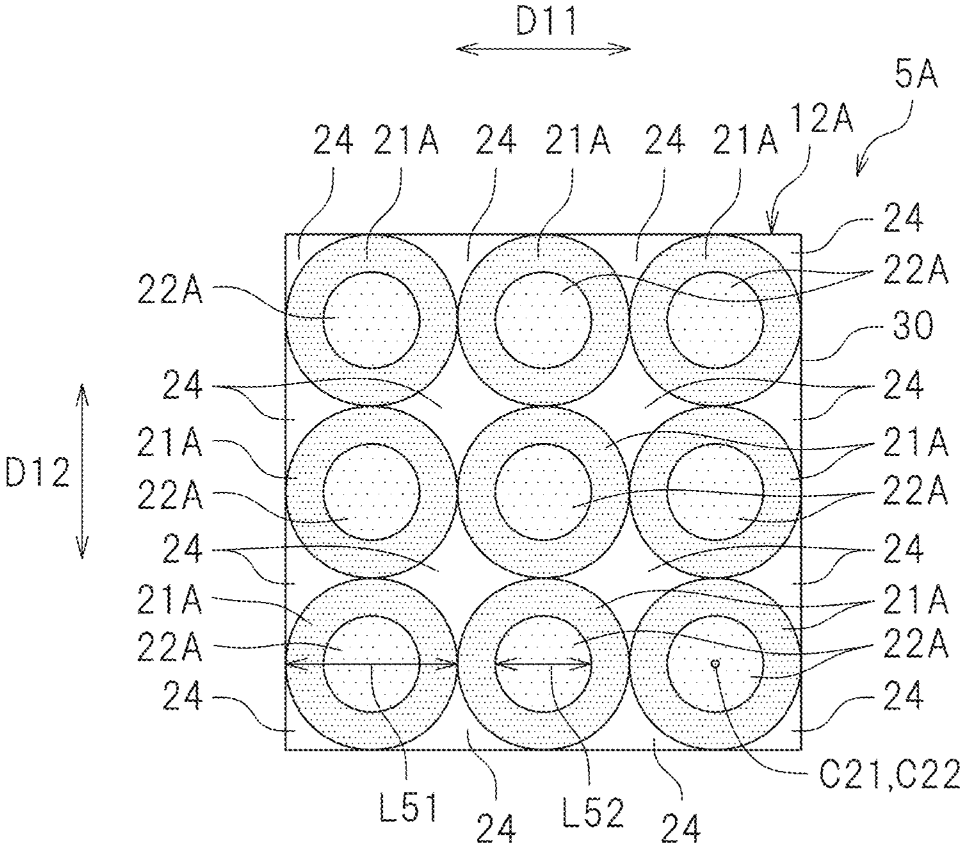
FIG. 14 is a plan view of an extracted area extracted from a second print layer of a printed matter according to a second preferred embodiment of the present invention.

A printed matter 5A according to a second preferred embodiment of the present invention will now be described. FIG. 14 is a plan view of an extracted area 30 extracted from a second print layer 12A of the printed matter 5A according to the second preferred embodiment. The printed matter 5A according to the present preferred embodiment includes a medium 10 (see FIG. 1), a first print layer 11 (see FIG. 1), and the second print layer 12A (see FIG. 14). As illustrated in FIG. 14, the second print layer 12A includes first print regions 21A and second print regions 22A.

In the present preferred embodiment, the first and second print regions 21A and 22A each have a circular shape. The first print regions 21A are different in size from the second print regions 22A. In this preferred embodiment, the first print regions 21A are larger than the second print regions 22A. Maximum dimensions L51 of the first print regions 21A (which are the diameters of the first print regions 21A) are larger than maximum dimensions L52 of the second print regions 22A (which are the diameters of the second print regions 22A). The second print regions 22A are each disposed inside an associated one of the first print regions 21A. The first print regions 21A thus each have a ring shape. In this preferred embodiment, a center C21 of each of the first print regions 21A corresponds to a center C22 of an associated one of the second print regions 22A.

In the present preferred embodiment, no protrusions or other elements are formed in regions 24 (which are regions of the second print layer 12A other than the first and second print regions 21A and 22A) by using ink, and the first print layer 11 is thus exposed through the regions 24. Although not described in detail, first protrusions 25 of the first print regions 21A and second protrusions 26 of the second print regions 22A are respectively similar to, for example, the first protrusions 25 and the second protrusions 26 according to the first preferred embodiment (see FIG. 7).

FIG. 15 is a table listing the sizes of the first print regions 21A, the second print regions 22A, the first protrusions 25, and the second protrusions 26 in Examples 13 to 24. In the present preferred embodiment, the printing method described above is performed using the printer 100 illustrated in FIG. 2, thus producing the printed matters 5A according to Examples 13 to 24 illustrated in FIG. 15. In each of Examples 13 to 24, the first and second protrusions 25 and 26 of the second print layer 12A each have a circular planar shape and a semicircular lateral shape.

In each of Examples 13 to 18, the diameters L51 (see FIG. 14) of the first print regions 21A of the second print layer 12A are about 1 mm, and the diameters L52 (see FIG. 14) of the second print regions 22A are about 0.5 mm. As illustrated in FIG. 14, the first print regions 21A are arranged in a first direction D11 and a second direction D12, and the second print regions 22A are also arranged in the first direction D11 and the second direction D12.

In Example 13 (see FIG. 15), maximum dimensions L11 of the first protrusions 25 of the first print regions 21A are about 50 μm, and arrangement intervals L21 between the first protrusions 25 are 150μ. In Example 13, maximum dimensions L12 of the second protrusions 26 of the second print regions 22A are about 100 μm, and arrangement intervals L22 between the second protrusions 26 are about 150 μm.

In Example 14, the maximum dimensions L11 of the first protrusions 25 of the first print regions 21A are about 50 μm, and the arrangement intervals L21 between the first protrusions 25 are about 300 μm. In Example 14, the maximum dimensions L12 of the second protrusions 26 of the second print regions 22A are about 250 μm, and the arrangement intervals L22 between the second protrusions 26 are about 300 μm.

In Example 15, the maximum dimensions L11 of the first protrusions 25 of the first print regions 21A are about 50 μm, and the arrangement intervals L21 between the first protrusions 25 are about 150 μm. In Example 15, the maximum dimensions L12 of the second protrusions 26 of the second print regions 22A are about 50 μm, and the arrangement intervals L22 between the second protrusions 26 are about 300 μm.

In Example 16, the maximum dimensions L11 of the first protrusions 25 of the first print regions 21A are about 100 μm, and the arrangement intervals L21 between the first protrusions 25 are about 150 μm. In Example 16, the maximum dimensions L12 of the second protrusions 26 of the second print regions 22A are about 50 μm, and the arrangement intervals L22 between the second protrusions 26 are about 150 μm.

In Example 17, the maximum dimensions L11 of the first protrusions 25 of the first print regions 21A are about 250 μm, and the arrangement intervals L21 between the first protrusions 25 are about 300 μm. In Example 17, the maximum dimensions L12 of the second protrusions 26 of the second print regions 22A are about 50 μm, and the arrangement intervals L22 between the second protrusions 26 are about 300 μm.

In Example 18, the maximum dimensions L11 of the first protrusions 25 of the first print regions 21A are about 50 μm, and the arrangement intervals L21 between the first protrusions 25 are about 300 μm. In Example 18, the maximum dimensions L12 of the second protrusions 26 of the second print regions 22A are about 50 μm, and the arrangement intervals L22 between the second protrusions 26 are about 150 μm.

Examples 19, 20, 21, 22, 23, and 24 are respectively similar to Examples 13, 14, 15, 16, 17, and 18 except that the diameters L51 of the first print regions 21A are about 2 mm and the diameters L52 of the second print regions 22A are about 1 mm.

Comparisons among the printed matters 5A according to Examples 13 to 24 suggest that at least either the first print regions 21A or the second print regions 22A of the printed matters 5A according to Examples 13 to 24 have different tactile textures. Accordingly, the printed matters 5A produced in Examples 13 to 24 provide different tactile textures. Consequently, the present preferred embodiment is able to produce the printed matters 5A that provide various types of tactile textures.

In the present preferred embodiment, the first print regions 21A are different in size from the second print regions 22A. The present preferred embodiment is thus able to provide various types of tactile textures in accordance with the degrees of differences in size between the first and second print regions 21A and 22A having different tactile textures.

Third Preferred Embodiment

Figure 16:
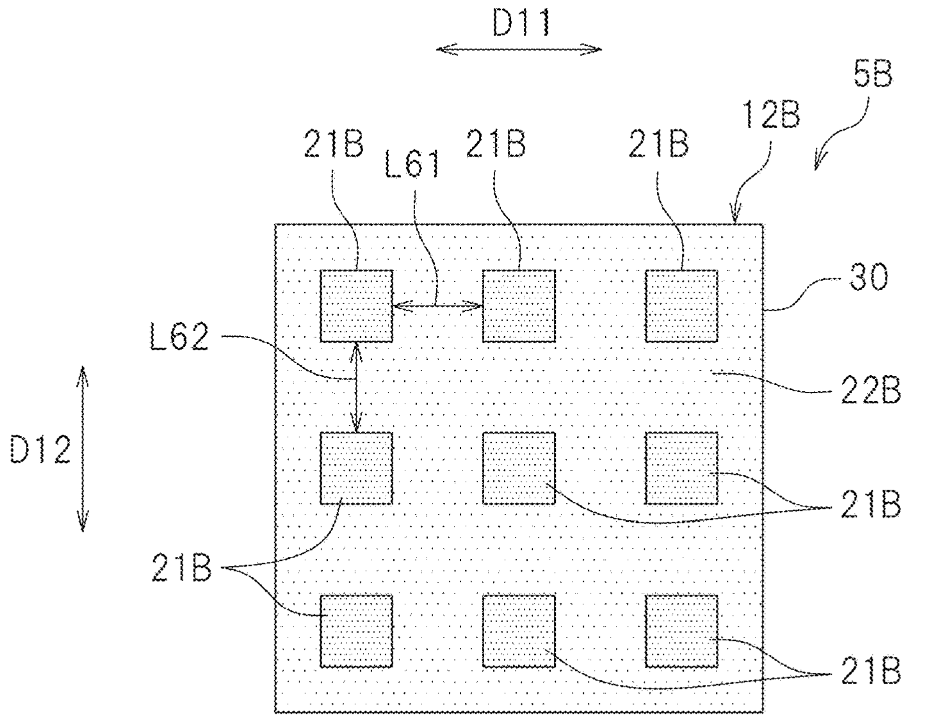
FIG. 16 is a plan view of an extracted area extracted from a second print layer of a printed matter according to a third preferred embodiment of the present invention.
Figure 17:
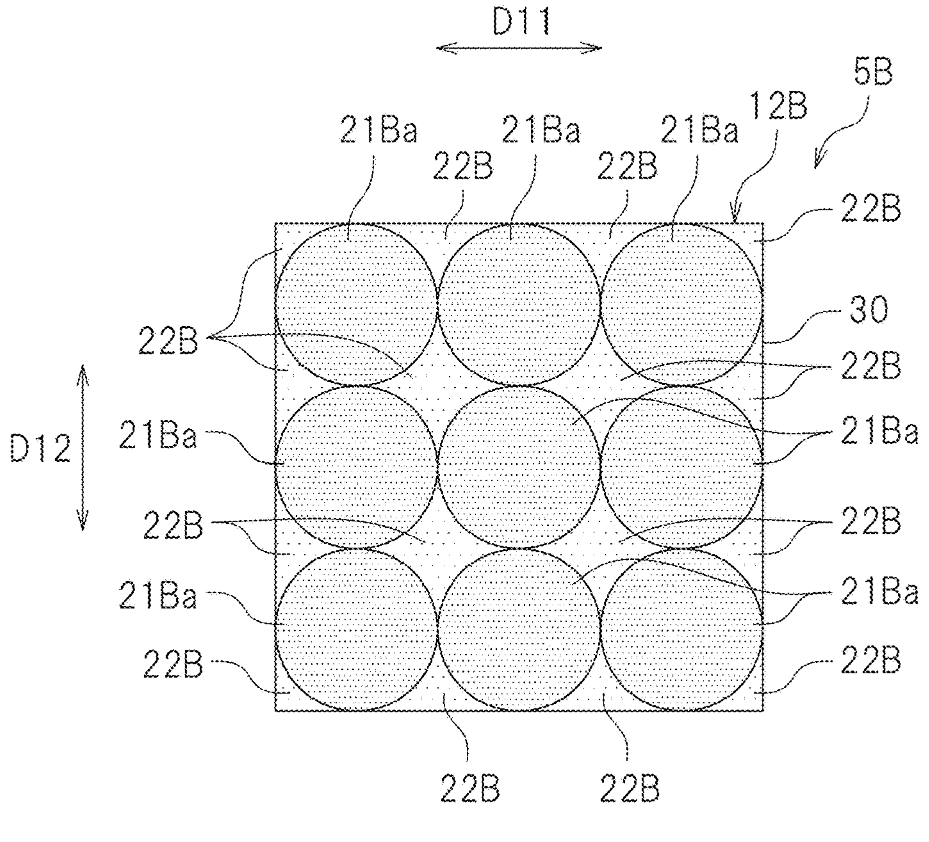
FIG. 17 is a plan view of an extracted area extracted from a second print layer according to a variation of the third preferred embodiment of the present invention.
Figure 18:
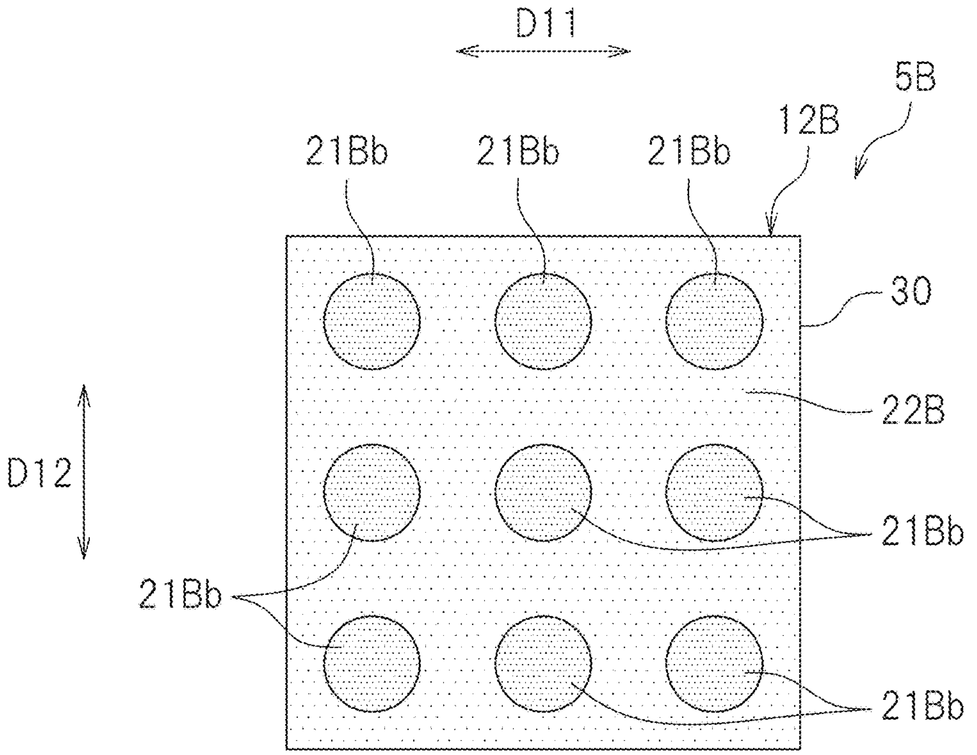
FIG. 18 is a plan view of an extracted area extracted from a second print layer according to another variation of the third preferred embodiment of the present invention.

A printed matter 5B according to a third preferred embodiment of the present invention will now be described. FIG. 16 is a plan view of an extracted area 30 extracted from a second print layer 12B according to the third preferred embodiment. The printed matter 5B according to the present preferred embodiment includes a medium 10 (see FIG. 1), a first print layer 11 (see FIG. 1), and the second print layer 12B (see FIG. 16). As illustrated in FIG. 16, the second print layer 12B includes first print regions 21B and a second print region 22B.

In the present preferred embodiment, the second print layer 12B includes more than one first print region 21B. The first print regions 21B are spaced away from each other. The first print regions 21B are all similar in shape. In this preferred embodiment, the first print regions 21B each have a polygonal shape (which is a rectangular shape in this preferred embodiment).

The first print regions 21B are arranged in a first direction D11. The first print regions 21B adjacent to each other in the first direction D11 have first intervals L61 therebetween. The first print regions 21B are arranged in a second direction D12. The first print regions 21B adjacent to each other in the second direction D12 have second intervals L62 therebetween. In the present preferred embodiment, the first intervals L61 are equal to the second intervals L62. Alternatively, the first intervals L61 may be different from the second intervals L62.

In the present preferred embodiment, the second print region 22B is a region of the second print layer 12B other than the first print regions 21B.

In the present preferred embodiment, the first print regions 21B are spaced away from each other. This enables the first print regions 21B to be scattered through the second print layer 12B. Accordingly, the present preferred embodiment is able to present various types of tactile textures by changing the way in which the first print regions 21B are scattered through the second print layer 12B.

In the present preferred embodiment, the first print regions 21B are similar in shape. This enables the first print regions 21B to be scattered regularly through the second print layer 12B.

In the present preferred embodiment, the first print regions 21B are disposed at the first intervals L61 in the first direction D11 and disposed at the second intervals L62 in the second direction D12. This enables the first print regions 21B to be scattered regularly through the second print layer 12B in the first direction D11 and the second direction D12. Accordingly, the user is able to feel the same pattern of touch when moving his or her fingertip along the printed matter 5B in the first direction D11 and when moving his or her fingertip along the printed matter 5B in the second direction D12.

Variations of Third Preferred Embodiment

Variations of the third preferred embodiment will now be described. FIGS. 17 to 20 are plan views respectively illustrating the extracted areas 30 extracted from the second print layers 12B according to first to fourth variations of the third preferred embodiment. In the third preferred embodiment, the first print regions 21B each have a rectangular shape (e.g., a square shape) as illustrated in FIG. 16. Alternatively, the first print regions 21B may each have any suitable shape other than a rectangular shape. In the first variation illustrated in FIG. 17, first print regions 21Ba each have a circular shape, and adjacent ones of the first print regions 21Ba, each having a circular shape, are in contact with each other. In the second variation illustrated in FIG. 18, first print regions 21Bb each have a circular shape, and adjacent ones of the first print regions 21Bb, each having a circular shape, are located away from each other.

Figure 19:
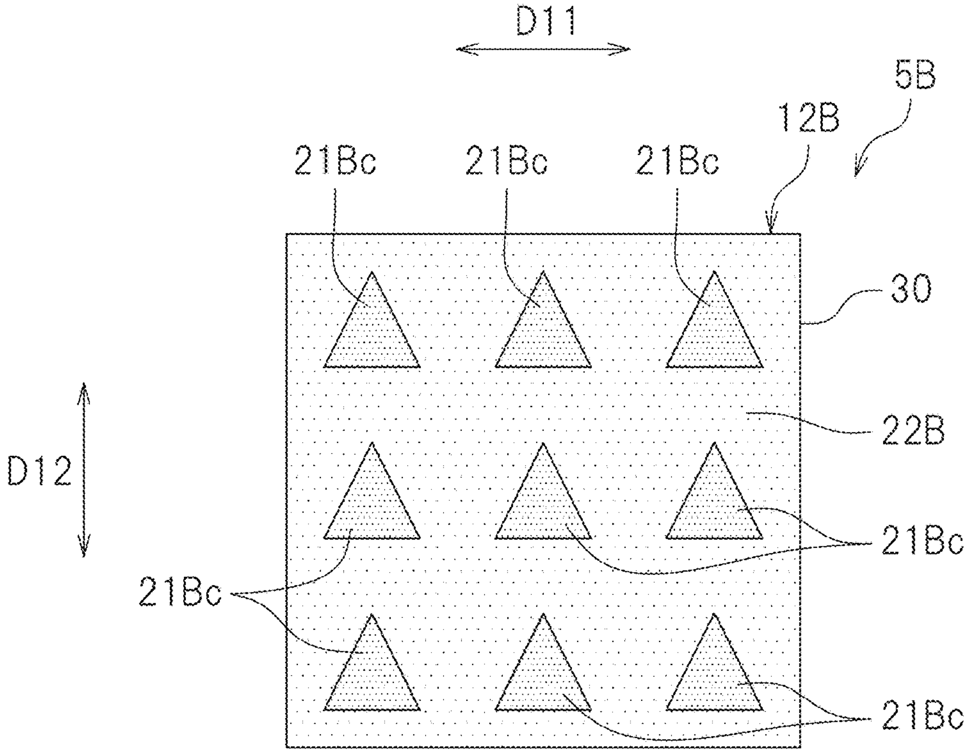
FIG. 19 is a plan view of an extracted area extracted from a second print layer according to still another variation of the third preferred embodiment of the present invention.
Figure 20:
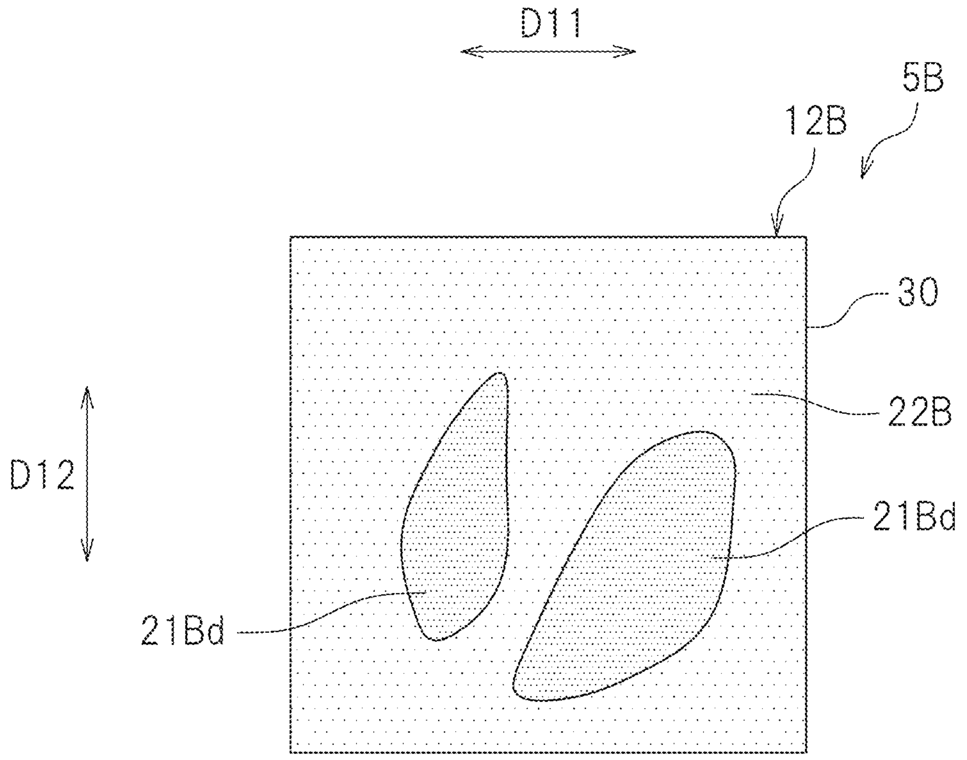
FIG. 20 is a plan view of an extracted area extracted from a second print layer according to yet another variation of the third preferred embodiment of the present invention.

In the third variation illustrated in FIG. 19, first print regions 21Bc each have a triangular shape.

As described above, the first print regions 21B, 21Ba, 21Bb, and 21Bc each have a circular shape or a polygonal shape. This makes it possible to provide various types of tactile textures in accordance with the shapes of the first print regions 21B, 21Ba, 21Bb, and 21Bc.

In the third preferred embodiment, the first print regions 21B are similar in shape. The first print regions 21B, however, do not necessarily have to be similar in shape. In the fourth variation illustrated in FIG. 20, first print regions 21Bd are different in shape.

Other Preferred Embodiments

Figure 21:
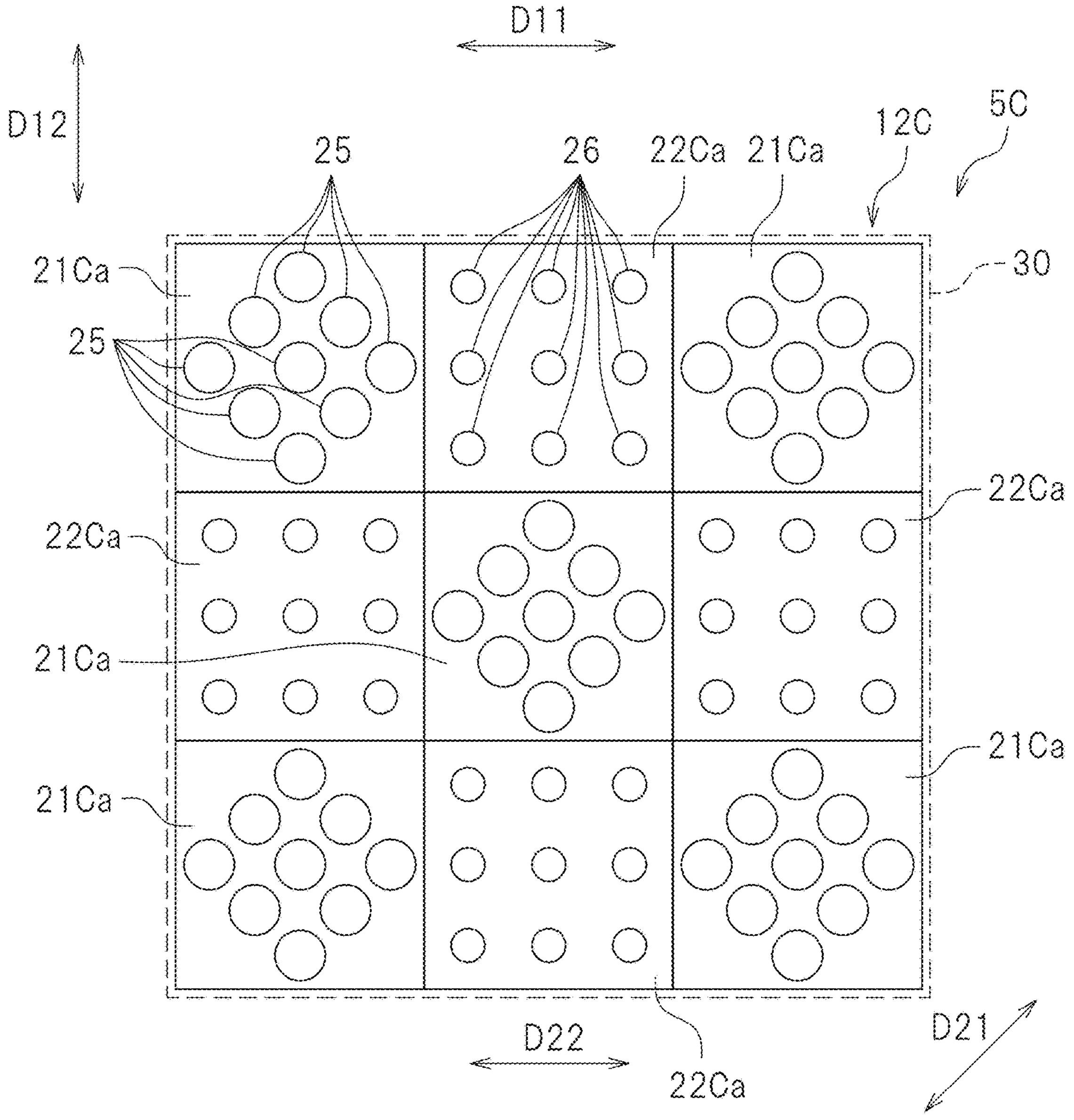
FIG. 21 is a plan view of an extracted area extracted from a second print layer according to another preferred embodiment of the present invention.

Other preferred embodiments of the present invention will now be described. FIG. 21 is a plan view of an extracted area 30 extracted from a second print layer 12C according to another preferred embodiment of the present invention. In the preferred embodiment illustrated in FIG. 21, an arrangement direction D21 of first protrusions 25 in first print regions 21Ca of the second print layer 12C is different from an arrangement direction D22 of second protrusions 26 in second print regions 22Ca of the second print layer 12C. In FIG. 21, the arrangement direction D21 of the first protrusions 25 is inclined by 45 degrees relative to a first direction D11. The arrangement direction D22 of the second protrusions 26 corresponds to the first direction D11.

Figure 22:
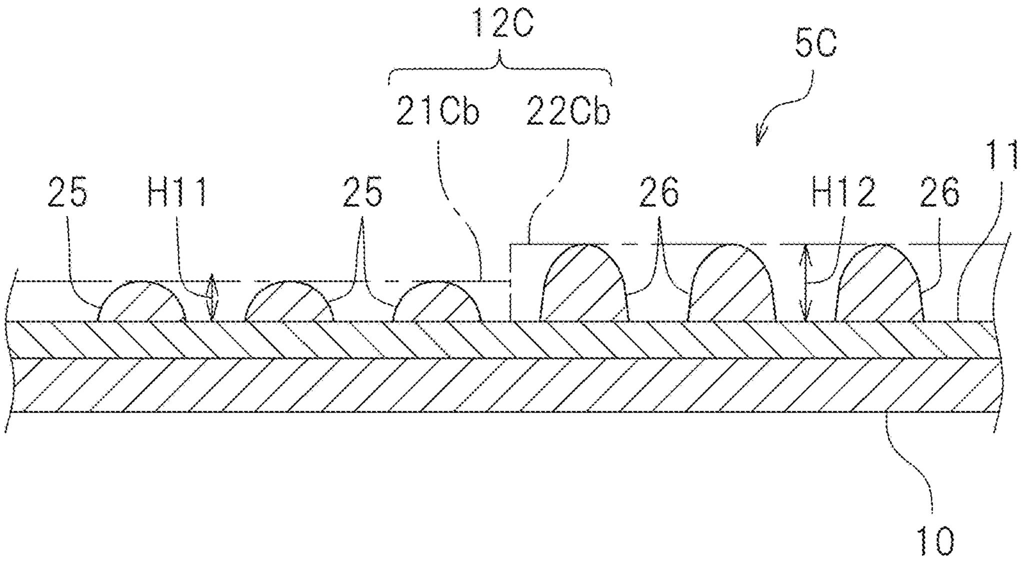
FIG. 22 is a cross-sectional view of a printed matter according to still another preferred embodiment of the present invention.

FIG. 22 is a cross-sectional view of a printed matter 5C according to still another preferred embodiment of the present invention. In the preferred embodiment illustrated in FIG. 22, a height H11 of first protrusions 25 in a first print region 21Cb of a second print layer 12C of the printed matter 5C is different from a height H12 of second protrusions 26 in a second print region 22Cb of the second print layer 12C of the printed matter 5C. In FIG. 22, the height H11 of the first protrusions 25 is lower than the height H12 of the second protrusions 26. Alternatively, the height H11 of the first protrusions 25 may be higher than the height H12 of the second protrusions 26.

Figure 23:
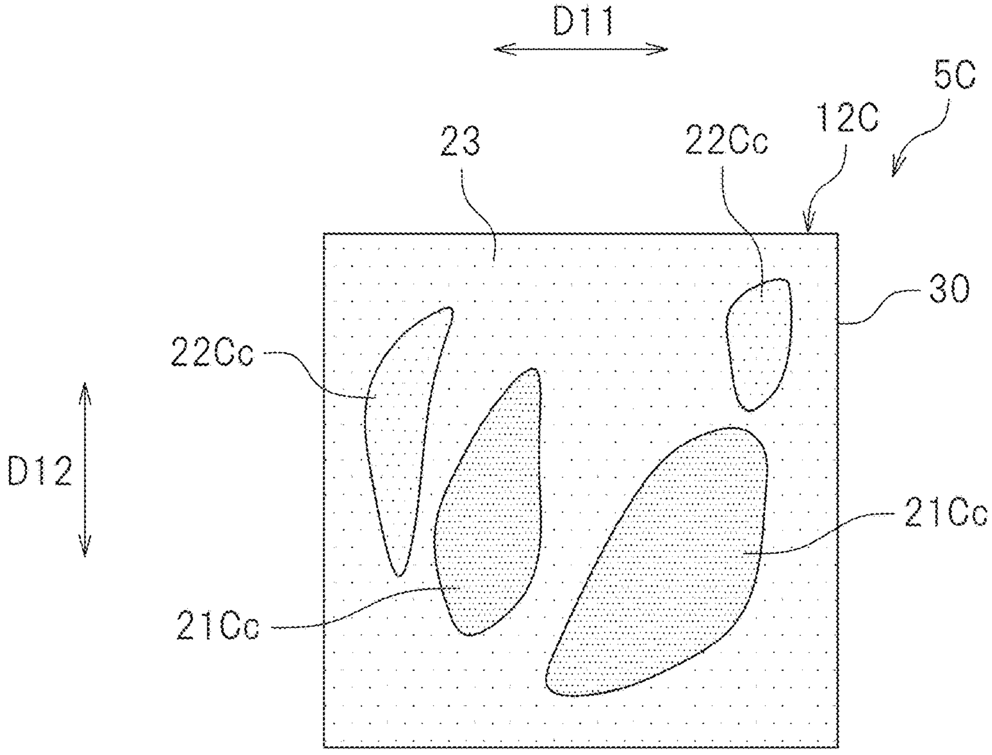
FIG. 23 is a plan view of an extracted area extracted from a second print layer according to yet another preferred embodiment of the present invention.

In each of the above preferred embodiments, the second print layer includes two types of print regions, i.e., the first and second print regions. Alternatively, the second print layer may include three or more types of print regions. FIG. 23 is a plan view of an extracted area 30 extracted from a second print layer 12C according to yet another preferred embodiment of the present invention. In the preferred embodiment illustrated in FIG. 23, the second print layer 12C includes three types of print regions, i.e., first print regions 21Cc, second print regions 22Cc, and a third print region 23. The first print regions 21Cc each include a plurality of first protrusions 25 (see FIG. 7). The second print regions 22Cc each include a plurality of second protrusions 26 (see FIG. 7). Although not illustrated, the third print region 23 includes a plurality of third protrusions.

Any one or more of the size, height, planar shape, arrangement interval, and arrangement direction of the third protrusions in the third print region 23 is/are different from a corresponding one or more of the size, height H11, planar shape, arrangement interval L21, and arrangement direction D21 of the first protrusions 25 in the first print regions 21Cc, and is/are different from a corresponding one or more of the size, height H12, planar shape, arrangement interval L22, and arrangement direction D22 of the second protrusions 26 in the second print regions 22Cc.

Figure 24:
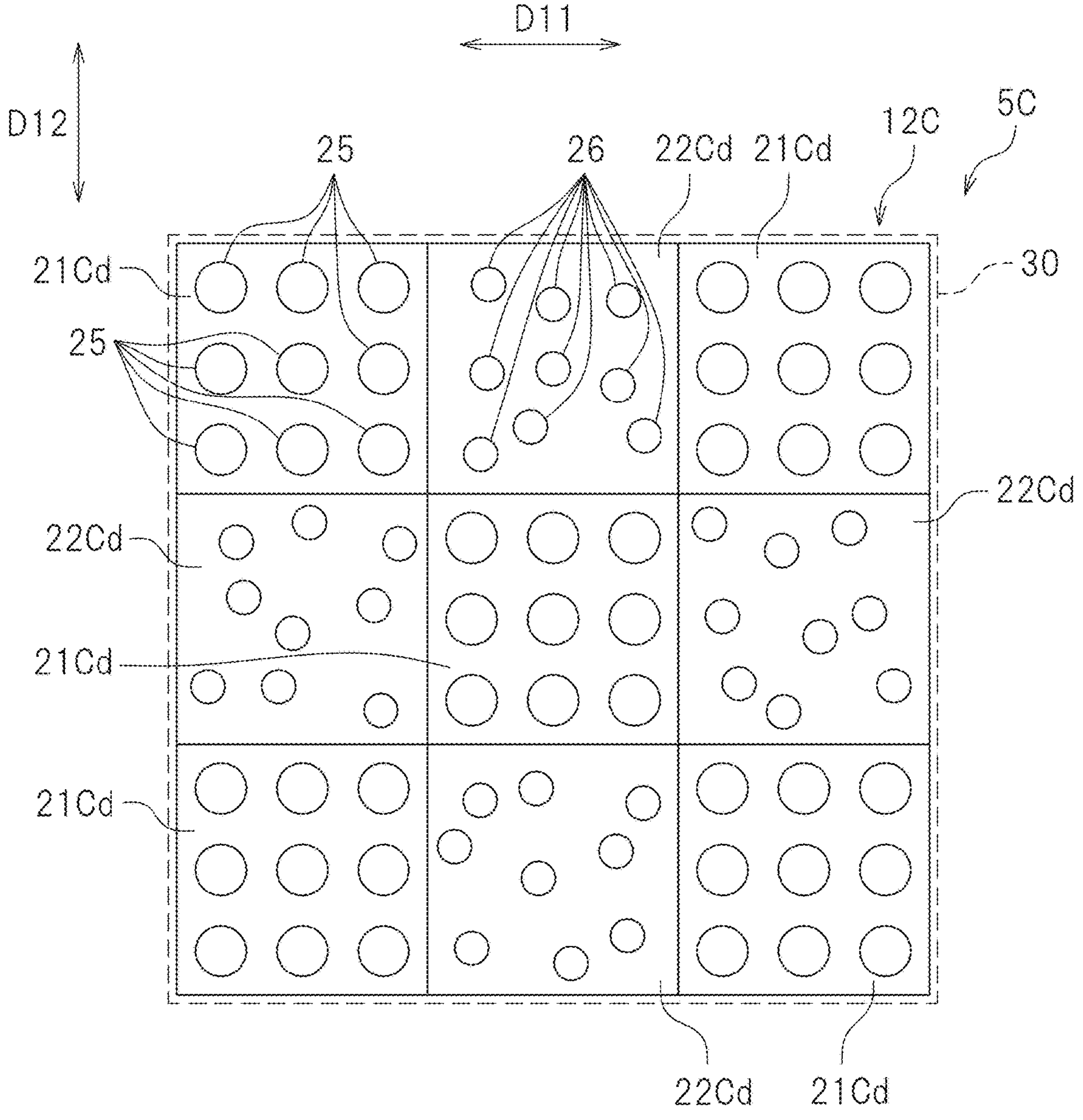
FIG. 24 is a plan view of an extracted area extracted from a second print layer according to still yet another preferred embodiment of the present invention.

In each of the above preferred embodiments, the first protrusions 25 of the first print regions and the second protrusions 26 of the second print regions are arranged regularly. Alternatively, the first protrusions 25 or the second protrusions 26 may be disposed randomly or irregularly. FIG. 24 is a plan view of an extracted area 30 extracted from a second print layer 12C according to still yet another preferred embodiment of the present invention. In the preferred embodiment illustrated in FIG. 24, first protrusions 25 in first print regions 21Cd of the second print layer 12C are disposed at regular intervals in a first direction D11 and a second direction D12 such that the first protrusions 25 are arranged regularly, but second protrusions 26 in second print regions 22Cd of the second print layer 12C are disposed randomly. In other words, the second protrusions 26 are disposed irregularly such that the second protrusions 26 adjacent to each other have different intervals therebetween. The second print regions 22Cd may have different numbers of second protrusions 26 disposed therein, or may have equal numbers of second protrusions 26 disposed therein.

In each of the above preferred embodiments, clear ink is discharged toward the medium 10 so as to form, for example, the second print layer 12 by using clear ink. The first and second protrusions 25 and 26 of the second print layer 12, for example, are thus formed by using clear ink. Alternatively, clear ink and color ink may be discharged so as to form the second print layer 12 by using clear ink and color ink. The controller 160 may be configured or programmed to control the ink heads 122 and the conveyor 150 so as to print the second print layer 12 by discharging clear ink and color ink toward the medium 10. In other words, the first and second protrusions 25 and 26 of the second print layer 12 may be formed by using clear ink and color ink. Color ink used to form the second print layer 12 may be of the same color as color ink used to form, for example, the first print layer 11 with which the second print layer 12 overlaps.

Instead of discharging clear ink, color ink may be discharged so as to form the second print layer 12 by using color ink. In other words, the first and second protrusions 25 and 26 of the second print layer 12, for example, may be formed not by using clear ink but by using color ink. The controller 160 may be configured or programmed to control the ink heads 122 and the conveyor 150 as to print the second print layer 12 by discharging color ink toward the medium 10.

Forming the first and second protrusions 25 and 26 by using color ink or by using clear ink and color ink as described above makes it possible to form the first and second protrusions 25 and 26 by using ink of the same color as color ink used to form the first print layer 11. Such an approach is able to make the first and second protrusions 25 and 26 difficult to see when the surface of the printed matter 5 is visually checked.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer comprising:

a support table to support a medium;

an ink head to discharge ink onto or toward the medium supported by the support table;

a conveyor to move the ink head relative to the medium supported by the support table; and a controller configured or programmed to exercise control so as to print a print layer on or over the medium by using only the ink discharged from the ink head; wherein the print layer includes:

at least one first print region including a plurality of first protrusions; and at least one second print region including a plurality of second protrusions;

any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region; and when an extracted area that is about 3 cm by about 3 cm is extracted from any location in the print layer, the first and second print regions are in the extracted area, and at least either a plurality of first print regions or a plurality of second print regions are in the extracted area.

2. The printer according to claim 1, wherein at least either the plurality of first print regions or the plurality of second print regions are spaced away from each other at least in one direction.

3. The printer according to claim 2, wherein at least either the first print regions or the second print regions have a same shape or substantially the same shape.

4. The printer according to claim 2, wherein at least either the first print regions or the second print regions each have a circular shape or a polygonal shape.

5. The printer according to claim 2, wherein at least either the first print regions or the second print regions are positioned at a first interval in a first direction.

6. The printer according to claim 5, wherein at least either the first print regions or the second print regions are positioned at a second interval in a second direction intersecting with the first direction.

7. The printer according to claim 1, wherein the plurality of first print regions are in the extracted area and spaced away from each other at least in one direction; and the plurality of second print regions are in the extracted area and spaced away from each other at least in one direction.

8. The printer according to claim 7, wherein the first and second print regions all have a same shape or substantially the same shape.

9. The printer according to claim 7, wherein the first and second print regions are provided alternately in a first direction.

10. The printer according to claim 9, wherein the first and second print regions are provided alternately in a second direction intersecting with the first direction.

11. The printer according to claim 7, wherein the first and second print regions each have a circular shape or a polygonal shape.

12. The printer according to claim 7, wherein the first print regions are different in size from the second print regions.

13. The printer according to claim 1, wherein the first and second protrusions each have a maximum dimension of about 1 mm or less in plan view.

14. The printer according to claim 1, wherein an interval between the first protrusions adjacent to each other is about 2 mm or less, and an interval between the second protrusions adjacent to each other is about 2 mm or less.

15. The printer according to claim 14, wherein the interval between the first protrusions adjacent to each other is about 20 μm or more, and the interval between the second protrusions adjacent to each other is about 20 μm or more.

16. The printer according to claim 1, wherein the first and second protrusions each have a height of about 10 mm or less.

17. The printer according to claim 1, wherein the first and second print regions each have an area of about 400 $\mu m^2$ or more in plan view.

18. The printer according to claim 1, wherein the ink head includes a first ink head to discharge clear ink; and the controller is configured or programmed to exercise control so as to print the print layer by discharging the clear ink onto or toward the medium.

19. The printer according to claim 1, wherein the ink head includes:

a first ink head to discharge clear ink; and a second ink head to discharge color ink; and the controller is configured or programmed to exercise control so as to print the print layer by discharging the clear ink and the color ink onto or toward the medium.

20. A printed matter comprising:

a medium; and a print layer on or over the medium, the print layer being made only of ink; wherein the print layer includes:

at least one first print region including a plurality of first protrusions; and at least one second print region including a plurality of second protrusions;

any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region; and when an extracted area that is about 3 cm by about 3 cm is extracted from any location in the print layer, the first and second print regions are in the extracted area, and at least either a number of first print regions or a number of second print regions in the extracted area is more than one.

21. A printing method comprising:

preparing a medium; and printing a print layer on or over the medium by using only ink; wherein the print layer includes:

at least one first print region including a plurality of first protrusions; and at least one second print region including a plurality of second protrusions;

any one or more of a size, a height, a planar shape, an arrangement interval, and an arrangement direction of the first protrusions in the first print region is/are different from a corresponding one or more of a size, a height, a planar shape, an arrangement interval, and an arrangement direction of the second protrusions in the second print region; and when an extracted area that is about 3 cm by about 3 cm is extracted from any location in the print layer, the first and second print regions are in the extracted area, and at least either a number of first print regions or a number of second print regions in the extracted area is more than one.

* * * * *